(12) United States Patent
Senzaki et al.

(10) Patent No.: US 10,229,479 B2
(45) Date of Patent: Mar. 12, 2019

(54) IMAGE SIGNAL PROCESSING APPARATUS, IMAGE SIGNAL PROCESSING METHOD AND IMAGE SIGNAL PROCESSING PROGRAM

(71) Applicant: NEC Corporation, Minato-ku, Tokyo (JP)

(72) Inventors: Kenta Senzaki, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/521,345

(22) PCT Filed: Nov. 6, 2015

(86) PCT No.: PCT/JP2015/005569
§ 371 (c)(1),
(2) Date: Apr. 24, 2017

(87) PCT Pub. No.: WO2016/075914
PCT Pub. Date: May 19, 2016

(65) Prior Publication Data
US 2017/0308995 A1  Oct. 26, 2017

(30) Foreign Application Priority Data
Nov. 13, 2014 (JP) ................. 2014-230381

(51) Int. Cl.
*G06K 9/40* (2006.01)
*G06T 5/00* (2006.01)
(Continued)

(52) U.S. Cl.
CPC ............ *G06T 5/002* (2013.01); *G06T 5/10* (2013.01); *G06T 7/11* (2017.01); *G06T 7/168* (2017.01);
(Continued)

(58) Field of Classification Search
CPC . G06T 2207/20024; G06T 2207/20064; G06T 2207/20182; G06T 2207/20192; G06T 5/002; G06T 5/10; G06T 7/11
See application file for complete search history.

(56) References Cited

U.S. PATENT DOCUMENTS 9,111,339 B1 * 8/2015 Huang .................. G06T 5/002
2009/0040386 A1 * 2/2009 Ishiga ..................... G06T 5/10
348/607
2010/0183225 A1 * 7/2010 Vantaram ................ G06T 7/11
382/173

FOREIGN PATENT DOCUMENTS

CN           104995658 A      10/2015
JP          2007148945 A       6/2007
(Continued)

OTHER PUBLICATIONS

Kenta Senzaki et al. "Filtering Direction Controlled Digital Total Variation Filter for Image Denoising" The Seventh International Workshop on Image Media Quality and its Applications, IMQA2014; Sep. 2-3, 2014 (6 pages total).
(Continued)

*Primary Examiner* — Phuoc Tran

(57) ABSTRACT

When performing noise removal of an image signal by applying the background art, there is a case where a filter coefficient that causes an edge constituting the image to become blurred against expectation due to the influence of noise in the image signal is set. The methods to solve this problem include a method for calculating a wide range of image feature values needed for correction of the filter coefficient, but this method has the problem that it requires a significant amount of calculation, thus increasing the calculation cost. To solve the above problem, the present invention is provided with an image signal input means, a wavelet transformation means, a first structure/texture sepa-
(Continued)

rating means, a texture component degenerating means, a first combining means, an inverse wavelet transformation means, and a second structure/texture separating means. The present invention is further provided with a second texture component degenerating means, a second combining means, and an image signal output means.

10 Claims, 17 Drawing Sheets

(51) Int. Cl.
    *H04N 1/409*     (2006.01)
    *G06T 7/11*     (2017.01)
    *G06T 7/168*     (2017.01)
    *G06T 5/10*     (2006.01)

(52) U.S. Cl.
    CPC ... *H04N 1/409* (2013.01); *G06T 2207/20024* (2013.01); *G06T 2207/20064* (2013.01); *G06T 2207/20182* (2013.01); *G06T 2207/20192* (2013.01)

(56) References Cited

FOREIGN PATENT DOCUMENTS

| | | |
|---|---|---|
| JP | 2012118752 A | 6/2012 |
| WO | 2011108144 A1 | 9/2011 |
| WO | 2014103230 A1 | 7/2014 |
| WO | 2014126153 A1 | 8/2014 |

OTHER PUBLICATIONS

David L. Donoho et al. "Ideal Spatial Adaptation by Wavelet Shrinkage" Biometrika, vol. 81, 1994 (30 pages total).
Leonid I. Rudin et al. "Nonlinear total variation based noise removal algorithms" Physica D vol. 60, 1992 North-Holland (pp. 259-268).
C. Tomasi et al. "Bilateral Filtering for Gray and Color Images" Proceedings of the 1998 IEEE International Conference on Computer Vision, Bombay, India, Jan. 1998 (8 pages total).
Tony F. Chan et al. "The Digital TV Filter and Nonlinear Denoising" IEEE Transactions on Image Processing, vol. 10 No. 2 Feb. 2001 (11 pages total).
Chris Harris et al. "A combined corner and Edge Detector", Proceedings third Alvey Vision Conference 1987 (pp. 147-151).
International Search Report and Written Opinion, PCT/ISA/237, issued by International Searching Authority in corresponding International Application No. PCT/JP2015/005569, dated Dec. 15, 2015.
Kazuhiro Fujita et al. "Image quality enhancement by degraded image restoration and noise removal," Triceps Co., Ltd., Mar. 26, 2008 (pp. 149 to 152).

* cited by examiner

IMAGE SIGNAL PROCESSING APPARATUS, IMAGE SIGNAL PROCESSING METHOD AND IMAGE SIGNAL PROCESSING PROGRAM

This application is a National Stage Entry of PCT/JP2015/005569 filed on Nov. 6, 2015, which claims priority from Japanese Patent Application 2014-230381 filed on Nov. 13, 2014, the contents of all of which are incorporated herein by reference, in their entirety.

TECHNICAL FIELD

The present invention relates to an image signal processing method, an image signal processing apparatus, and an image signal processing program, and particularly to an image signal processing method, an image signal processing apparatus, and an image signal processing program that remove noise from an image.

BACKGROUND ART

Among image signal processing technologies, a technology of removing noise included in an image is an essential technology for reproducing a captured image more clearly.

In relation to a technology of removing noise in a captured image, PTLs 1 to 3 and NPLs 1 and 2 disclose the following technologies.

PTL 1 discloses a method of improving image quality of an image through wavelet transformation and inverse wavelet transformation.

PTL 2 discloses a method of creating a tentative high-resolution image (base image) by enlarging an input image to an output size.

PTL 3 discloses a method of wavelet-transforming an original image, restoring damage of the image by interpolation with respect to a low-frequency component, performing an inverse wavelet transformation by use of the restored low-frequency component and a high-frequency component, and reconstructing the image to obtain a final restored image.

NPL 1 discloses a technique of denoising processing (referring to noise removal processing; hereinafter the same) based on component separation of an image.

NPL 2 discloses a technique of denoising processing based on wavelet shrinkage.

For the purpose of facilitating understanding of the present invention, outlines of the technologies disclosed in NPLs 1 and 2 will be briefly described below.

First the technology in NPL 1 will be described.

FIG. 15 is a conceptual diagram for illustrating the technology in NPL 1.

First, a structure-texture decomposition (STD) unit 1001 separates an input original image signal $f_{in}$ into a structure component u composed of an edge component and a flat component of the image, and a texture component v composed of noise and a fine pattern. A total variation minimization (TV) method in NPL 3, a bilateral filter in NPL 4, or the like may be used for the separation.

Next, a texture component (TC) shrinkage unit 1002 applies processing of suppressing a noise component in the texture component v to generate a noise-suppressed texture component v'. While various methods may be applied to the noise suppression processing, soft-decision threshold processing expressed as equation (1) below is effective.

$$v' = \text{Sign}(v) \times \max(|v|-\tau, 0) \quad (1)$$

Sign(v) in the equation is a function returning a sign of v, and $\tau$ denotes noise attenuation. Alternatively, hard-decision threshold processing expressed as equation (2) below may be applied.

$$v' = \begin{cases} 0 & |v| \leq \tau \\ v & |v| > \tau \end{cases} \quad (2)$$

Finally, a combining unit 1003 combines the structure component u with the noise-suppressed texture component v' to generate an output image signal.

The TV method being one of the techniques of separating an input image signal into a structure component u and a texture component v will be described. The structure component u can be obtained by introducing a regularization term to a total variation norm TV(u) expressed as equation (3) below, and minimizing equation (4) below.

$$TV(u) = \int_\Omega |\nabla u| dx \quad (3)$$

$$TV(u) + \frac{\mu}{2}\int_\Omega (u-u_0)^2 dx \quad (4)$$

In equation (4), $u_0$ denotes an original image signal f, and $\mu$ is a parameter indicating fidelity to the original image signal.

Methods for solving equation (3) include a digital TV filter (DTVF) in NPL 5. It is assumed that a pixel value of an image u at a pixel position $\alpha=(i,j)$ is denoted as $u_\alpha$. It is further assumed that a set of neighborhood pixel positions of $\alpha$ is denoted as $N(\alpha)$. When eight neighbors are assumed as the neighborhood, $$N(\alpha)=\{(i,j\pm1), (i\pm1,j), (i+1,j\pm1), (i-1,j\pm1)\}$$

holds. In the DTVF, filtering processing based on a local variation is used for solving equation (4). Assuming that an input image signal is denoted as $u^{(0)}$, and an output image signal after N sets of filtering is denoted as $u^{(N)}$, a filter output $u_\alpha^{(N)}$ at the pixel position $\alpha$ is expressed as equation (5) below.

$$u_\alpha^{(n)} = \sum_{\beta \in N(\alpha)} h_{\alpha\beta} u_\beta^{(n-1)} + h_{\alpha\alpha} u_\alpha^{(0)} \quad (5)$$

In equation (5), $h_{\alpha\beta}$ and $h_{\alpha\alpha}$ are filter coefficients (referring to coefficients in filtering processing; hereinafter the same), and are expressed as equations (6), (7), and (8) below.

$$h_{\alpha\beta} = \frac{w_{\alpha\beta}(u)}{u + \sum_{\gamma \in N(\alpha)} w_{\alpha\gamma}(u)} \quad (6)$$

$$h_{\alpha\alpha} = \frac{u}{u + \sum_{\gamma \in N(\alpha)} w_{\alpha\gamma}(u)} \quad (7)$$

$$w_{\alpha\gamma}(u) = \frac{1}{|\nabla_\alpha u|} + \frac{1}{|\nabla_\gamma u|} \quad (8)$$

In equation (8), $|\nabla_\alpha u|$ and $|\nabla_\gamma u|$ denote local variations defined by equation (9) below.

$$|\nabla_\alpha u| = \sqrt{\sum_{\beta \in N(\alpha)} (u_\beta - u_\alpha)^2} \quad (9)$$

From the equations, when a local variation $|\nabla_\beta u|$ at a pixel β adjacent to α is sufficiently larger than a noise component, $h_{\alpha\alpha}$ becomes $h_{\alpha\alpha} \approx 1$, and therefore blurring of an edge can be prevented. Conversely, when the local variation $|\nabla_\beta u|$ is small, the DTVF assumes the region to be flat, and $h_{\alpha\alpha}$ becomes $h_{\alpha\alpha} \approx 0$, and therefore behaves like an ordinary low-pass filter. As for μ, μ may be determined as $\mu = 1/\sigma^2$ using an estimated noise standard deviation σ. Practically, in order to prevent division by zero in equation (8), $$|\nabla_\alpha u|_\varepsilon = \sqrt{|\nabla_\alpha u|^2 + \varepsilon^2}$$

is used in place of the local variation $|\nabla_\alpha u|$.

Next, the technology in NPL 2 (wavelet shrinkage) will be described.

FIG. 16 is a conceptual diagram for illustrating the technology in NPL 2.

First, wavelet transformation (WT) units 2001, 2002, and 2003 separate an input image signal into a plurality of frequency components by wavelet transformation (multi-resolution decomposition).

While this example illustrates three-level wavelet transformation, the number of levels of transformation may be arbitrarily set. Naturally, the number of levels of transformation may also be arbitrarily set in the wavelet shrinkage in FIG. 16. Further, it is assumed in the description below that a resolution becomes lower as the number of levels becomes greater.

Next, a WC shrinkage unit 2004 applies processing of setting a wavelet coefficient with a small absolute value to zero (shrinkage processing) to high-frequency components $LH_3$, $HL_3$, and $HH_3$ with the lowest resolution, to obtain $LH_3'$, $HL_3'$, and $HH_3'$. Note that WC stands for wavelet coefficient. While the processing method includes various types, equations (1) and (2) may be simply used. When noise is random noise, a noise component included in the input image is distributed across all wavelet coefficients, and therefore noise can be removed by subtracting a noise portion from each wavelet coefficient. Then, an IWT unit 2005 generates a noise-suppressed low-frequency component $LL_2'$ at a level one step higher than the lowest resolution, by an inverse wavelet transformation. Note that IWT stands for inverse WT, that is, inverse wavelet transformation. The generation is performed with a low-frequency component $LL_3$ with the lowest resolution and high-frequency components $LH_3'$, $HL_3'$, and $HH_3'$ with the lowest resolution, being applied with the shrinkage processing.

Subsequently, with regard to a resolution other than the lowest resolution, similarly to the processing at the lowest resolution, the shrinkage processing is successively applied to a high-frequency wavelet coefficient with the resolution concerned (WC shrinkage units 2006 and 2008). Then, from a low-frequency component with the resolution concerned obtained from a resolution one level lower than the resolution concerned and a high-frequency component with the resolution concerned, being applied with the shrinkage processing, a low-frequency component with a resolution one level higher than the resolution concerned is generated by an inverse wavelet transformation (IWT units 2007 and 2009). Then, an inverse wavelet transformation result at the highest resolution is determined to be an output image.

FIG. 17 is a diagram illustrating an application example of the technology in NPL 2. The left part of FIG. 17 is an input image, the middle part of FIG. 17 is a single-level wavelet transformation result, and the right part of FIG. 17 is a three-level wavelet transformation result. In the diagram, LL1 denotes an 1-th level low-frequency component, $LH_1$, $HL_1$, and $HH_1$ denote 1-th level high-frequency components.

Further, in relation to the present invention, other technologies described in NPLs 3 to 7 are disclosed.

CITATION LIST

Patent Literature

[PTL 1] International Application Publication No. WO 2011/108144

[PTL 2] Japanese Unexamined Patent Application Publication No. 2012-118752

[PTL 3] Japanese Unexamined Patent Application Publication No. 2007-148945

Non Patent Literature

[NPL 1] Kazuhiro Fujita (supervisor and author), Mitsuji Muneyasu, Nobuyuki Nakamori, Hiroshi Kondo, Riichi Nagura, Nobuyuki Watanabe, and Hongen Liao, "Image quality enhancement by degraded image restoration and noise removal," TRICEPS Co., Ltd., Mar. 26, 2008, pp. 149 to 152

[NPL 2] David L. Donoho and Iain M. Johnstone, "Ideal spatial adaptation by wavelet shrinkage," Biometrika, vol. 81, pp. 425 to 455, 1994

[NPL 3] L. Rudin, S. Osher, and E. Fatemi, "Nonlinear total variation based noise removal algorithms," Physica D, vol. 60, 1992, pp. 259 to 268

[NPL 4] C. Tomasi and R. Manduchi, "Bilateral filtering for gray and color images," Sixth International Conference on Computer Vision, pp. 839 to 846, Jan. 1998

[NPL 5] T. F. Chan, S. Osher, and J. Shen, "The digital TV filter and nonlinear denoising," IEEE Transactions on Image Processing, vol. 10, No. 2, pp. 231 to 241, Feb. 2001

[NPL 6] Kenta Senzaki, Masato Toda, Masato Tsukada, "Filtering Direction Controlled Digital Total Variation Filter for Image Denoising," The Seventh International Workshop on Image Media Quality and its Applications (IMQA2014), Sep. 2014

[NPL 7] Chris Harris and Mike Stephens, "A Combined Corner and Edge Detector," in Alvey Vision Conference, pp. 1 to 6, 1988

SUMMARY OF INVENTION

Technical Problem

When performing noise removal (noise removal herein refers to removal or reduction of noise) of an image signal by applying the background art, a filter coefficient that blurs an edge constituting the image may be unexpectedly set due to influence of noise in the image signal.

As a method for solving the problem, a method of calculating a wide range of image feature amounts required for correction of a filter coefficient may be considered; however, the method requires an enormous amount of calculation leading to increase of a calculation cost.

An object of the present invention is to provide an image signal processing method and the like that solve the aforementioned problem and are less likely to set a filter coefficient unexpectedly blurring, due to influence of noise, an edge constituting an image. The image signal processing method and the like described above are able to suppress increase of a calculation cost.

Solution to Problem

An image signal input unit inputting an image signal of an original image and a wavelet transformation unit generating a low-frequency component and a high-frequency component by wavelet-transforming the image signal are provided. Additionally, a first structure-texture separation unit separating the low-frequency component into a first structure component and a first texture component, and a texture component shrinkage unit correcting a value of the first texture component to generate a corrected first texture component are provided. In addition, a first combining unit combining the first structure component with the corrected first texture component to generate a combined low-frequency component, and an inverse wavelet transformation unit generating an inverse-wavelet-transformed image signal by inverse-wavelet-transforming the high-frequency component and the combined low-frequency component are provided. Further, a second structure-texture separation unit separating the inverse-wavelet-transformed image signal into a second structure component and a second texture component, and a second texture component shrinkage unit correcting a value of the second texture component to generate a corrected second texture component are provided. Furthermore, a second combining unit combining the second structure component with the corrected second texture component to generate an image signal processing signal, and an image signal output unit outputting the corrected image signal are provided.

Advantageous Effects of Invention

An image signal processing apparatus according to the present example embodiment is able to compute a filter coefficient used for structure-texture decomposition in denoising processing, from an image with less noise than that in an original image, being generated by use of wavelet transformation. A low-frequency component in a wavelet transformation is an image signal with a resolution lower than that of an image signal of the original image. A filter coefficient computed from the image signal with a resolution lower than that of the original image is generated by referring to a wider range of pixel values compared with a filter coefficient computed from an image signal with the same resolution as the original image signal. Further, noise in the image signal with a resolution lower than that of the original image is more suppressed than noise in the image with the resolution concerned, and therefore influence of noise in filter coefficient computation is less, compared with the image signal with the same resolution as the original image signal. Accordingly, obtaining a filter coefficient used in structure-texture decomposition, in accordance with the low-frequency component, reduces likelihood of setting a filter coefficient that blurs, due to influence of noise, an edge constituting the image. Consequently, noise in the low-frequency component can be effectively suppressed while preserving an edge component included in the low-frequency component. Additionally, when an image with the same resolution as the original image is generated from the noise-suppressed low-frequency component by use of inverse wavelet transformation, noise in the image is more suppressed than that in the original image, and therefore influence of noise in filter coefficient computation is less, compared with the original image signal. Accordingly, the likelihood of setting a filter coefficient that blurs, due to influence of noise, an edge constituting the image is reduced, and noise can be effectively suppressed while preserving the edge component. In addition, the image signal processing apparatus according to the present example embodiment does not require correction of a filter coefficient by use of a calculation result of a wide range of image feature amounts, and therefore is able to suppress increase of a calculation cost.

DESCRIPTION OF EMBODIMENTS

<First Example Embodiment>

A first example embodiment is an example embodiment related to an image signal processing apparatus with a minimum configuration of the present invention.

[Image Signal Processing Apparatus According to Present Example Embodiment]

Figure 1:
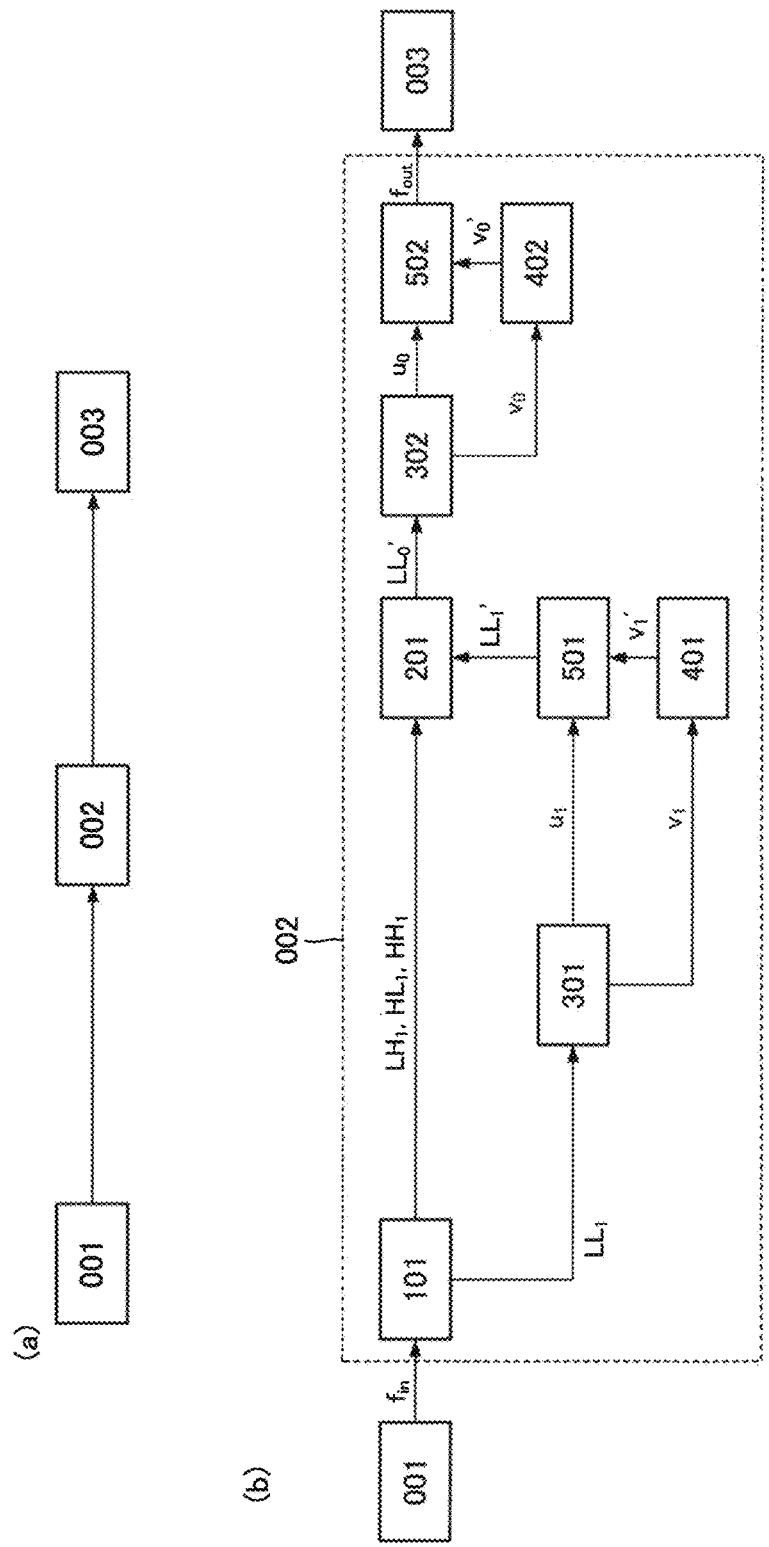
FIG. 1 is conceptual diagrams illustrating an image signal processing apparatus according to a first example embodiment.

FIG. 1 is conceptual diagrams illustrating an image signal processing apparatus according to the first example embodiment. A configuration illustrated in a part (b) of the diagram is a minimum configuration of the present invention.

As illustrated in a part (a) of the diagram, the image signal processing apparatus according to the present example embodiment includes an image signal input unit 001, an image signal processing unit 002, and an image signal output unit 003.

The image signal input unit 001 outputs an input image signal of an original image to the image signal processing unit 002.

The image signal processing unit 002 performs denoising processing on an input image signal of an original image, and outputs a corrected image signal undergoing the denoising processing to the image signal output unit 003.

The image signal output unit 003 outputs an image signal undergoing denoising processing to the outside.

As illustrated in the part (b) of the diagram, the image signal processing unit 002 includes a wavelet transformation (WT) unit 101. The image signal processing unit 002 further includes an inverse wavelet transformation (IWT) unit 201. The image signal processing unit 002 further includes a first structure-texture decomposition (STD) unit 301. The image signal processing unit 002 further includes a second STD unit 302 and a first texture component (TC) shrinkage unit 401. The image signal processing unit 002 further includes a second TC shrinkage unit 402, a first combining unit 501, and a second combining unit 502.

An operation of each unit will be described below.

The WT unit 101 applies a single-level wavelet transformation to an original image signal $f_{in}$ input from the image signal input unit 001 to compute a low-frequency component $LL_1$ and high-frequency components $LH_1$, $HL_1$, and $HH_1$ of the wavelet transformation. Then, the WT unit 101 outputs the low-frequency component $LL_1$ to the first STD unit 301, and the high-frequency components $LH_1$, $HL_1$, and $HH_1$ to the IWT unit 201.

The low-frequency component $LL_1$ is an image signal with a resolution one level lower than the original image signal $f_{in}$ in terms of wavelet transformation.

The first STD unit 301 separates a low-frequency component $LL_1$ of a wavelet transformation input from the WT unit 101 into a structure component $u_1$ and a texture component $v_1$. Next, the first STD unit 301 outputs the structure component $u_1$ to the first combining unit 501, and the texture component $v_1$ to the first TC shrinkage unit 401.

The first TC shrinkage unit 401 applies processing of suppressing a noise component to a texture component $v_1$ input from the first STD unit 301 to generate a noise-suppressed texture component $v_1'$, and outputs the texture component $v_1'$ to the first combining unit 501.

The first combining unit 501 combines a structure component $u_1$ input from the first STD unit 301 with a noise-suppressed texture component $v_1'$ input from the first TC shrinkage unit 401 to generate a corrected low-frequency component $LL_1'$.

Then, the first combining unit 501 outputs the corrected low-frequency component $LL_1'$ to the IWT unit 201.

The IWT unit 201 generates a noise-removed reconstructed image signal $LL_0'$ from a corrected low-frequency component $LL_1'$ input from the first combining unit 501 and high-frequency components $LH_1$, $HL_1$, and $HH_1$ input from the WT unit 101, by use of inverse wavelet transformation. The reconstructed image signal $LL_0'$ is an image signal with the same resolution as an input image signal $f_{in}$. Then, the IWT unit 201 outputs the noise-removed reconstructed image signal $LL_0'$ to the second STD unit 302.

The second STD unit 302 separates a corrected reconstructed image $LL_0'$ input from the IWT unit 201 into a structure component $u_0$ and a texture component $v_0$. Then, the second STD unit 302 outputs the structure component $u_0$ to the combining unit 502, and the texture component $v_0$ to the second TC shrinkage unit 402.

Similarly to the first TC shrinkage unit 401, the second TC shrinkage unit 402 applies processing of suppressing a noise component to a texture component $v_0$ input from the second STD unit 302 to generate a noise-suppressed texture component $v_0'$. Then, the second TC shrinkage unit 402 outputs the generated texture component $v_0'$ to the second combining unit 502.

Similarly to the first combining unit 501, the second combining unit 502 combines a structure component $u_0$ input from the second STD unit 302 with a noise-suppressed texture component $v_0'$ input from the second TC shrinkage unit 402 to generate an output image signal $f_{out}$. Then, the second combining unit 502 outputs generated $f_{out}$ to the image signal output unit 003.

[Image Signal Processing Method According to Present Example Embodiment]

Next, an image signal processing method according to the present example embodiment will be described.

Figure 2:
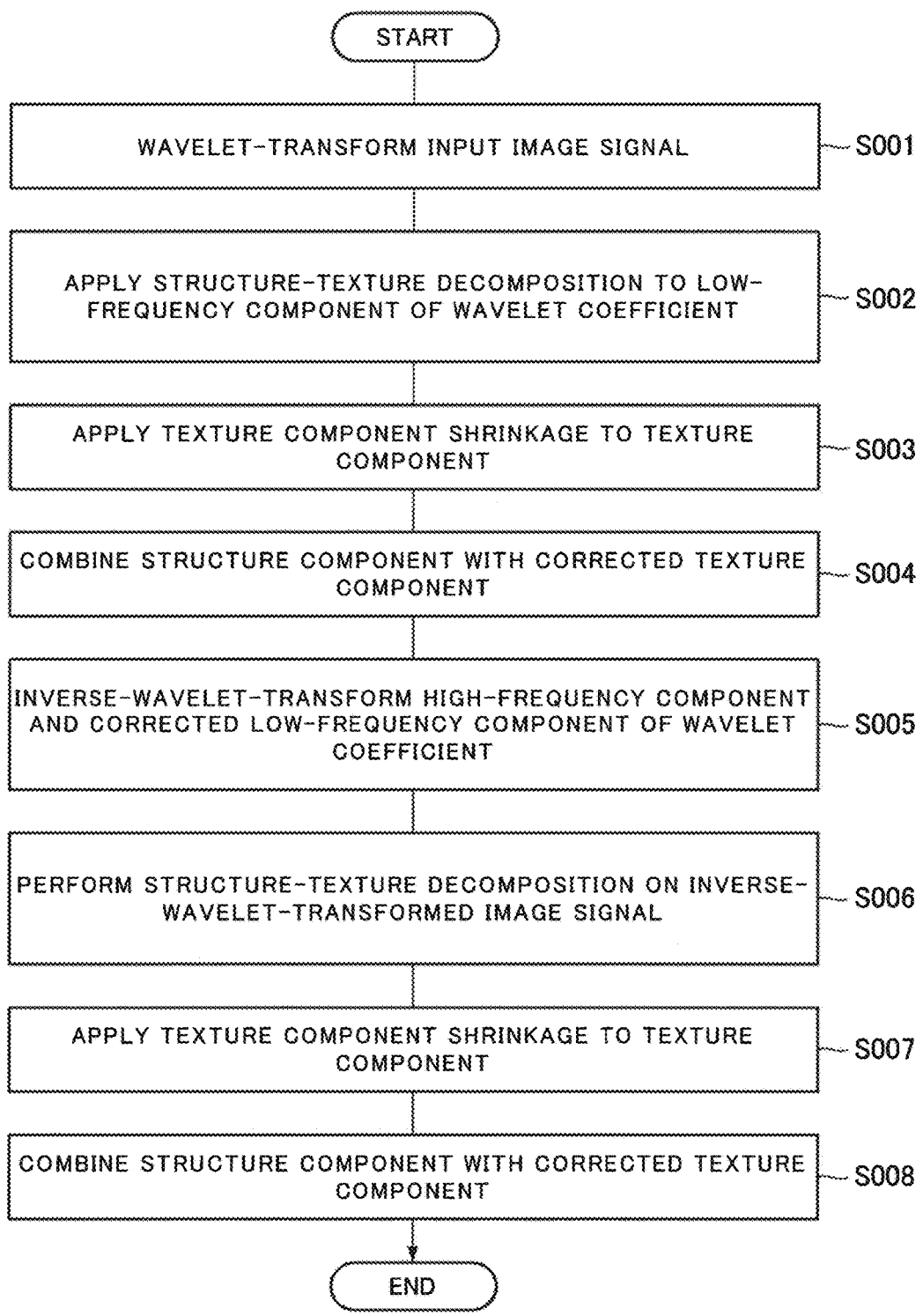
FIG. 2 is a flowchart illustrating an operation in an image signal processing method according to the first example embodiment.

FIG. 2 is a flowchart illustrating an operation in the image signal processing method according to the first example embodiment.

First, the WT unit 101 applies a wavelet transformation to an input image signal to obtain a low-frequency component and a high-frequency ((component of the input image (S001). The first STD unit 301 applies structure-texture decomposition to the low-frequency component obtained by the wavelet transformation, by the procedure described above in relation to the unit, to obtain a structure component and a texture component of the low-frequency component (S002). Additionally, the first TC shrinkage unit 401 obtains a noise-suppressed texture component from the texture component of the low-frequency component by the procedure described above in relation to the unit (S003). Then, the first combining unit 501 combines the structure component of the low-frequency component with the noise-suppressed texture component, by the procedure described above in relation to the unit, to obtain a corrected low-frequency component (S004). By use of the thus corrected low-frequency component and the high-frequency component, a reconstructed image signal is obtained by applying an inverse wavelet transformation (S005). The second STD unit 302 applies structure-texture decomposition to the reconstructed image signal, by the procedure described above in relation to the unit, to obtain a structure component and a texture component of the reconstructed image signal (S006). Additionally, the second TC shrinkage unit 402 applies the procedure described above in relation to the unit to the texture component of the reconstructed image signal to obtain a noise-suppressed texture component (S007). Then, the second combining unit 502 combines the structure component of the reconstructed image signal with the noise-suppressed texture component of the reconstructed image signal to generate an output image signal (S008).

[Effect of Present Example Embodiment]

The image signal processing apparatus according to the present example embodiment is able to compute a filter coefficient used for structure-texture decomposition in denoising processing, from an image with less noise than that in an original image, being generated by use of wavelet transformation. A low-frequency component in a wavelet transformation is an image signal with a resolution lower than that of an image signal of the original image. A filter coefficient computed from the image signal with a resolution lower than that of the original image is generated by referring to a wider range of pixel values compared with a filter coefficient computed from an image signal with the same resolution as the original image signal. Further, noise in the image signal with a resolution lower than that of the original image is more suppressed than noise in the image with the resolution concerned, and therefore influence of noise in filter coefficient computation is less compared with the image signal with the same resolution as the original image signal. Accordingly, obtaining a filter coefficient used in structure-texture decomposition, in accordance with the low-frequency component, reduces the likelihood of setting a filter coefficient that blurs, due to the influence of noise, an edge constituting the image. Consequently, noise in the low-frequency component can be effectively suppressed while preserving an edge component included in the low-frequency component. Additionally, when an image with the same resolution as the original image is generated from the noise-suppressed low-frequency component by use of inverse wavelet transformation, noise in the image is more suppressed than that in the original image, and therefore influence of noise in filter coefficient computation is less, compared with the original image signal. Accordingly, the likelihood of setting a filter coefficient that blurs, due to the influence of noise, an edge constituting the image is reduced, and noise can be effectively suppressed while preserving the edge component. In addition, the image signal processing apparatus according to the present example embodiment does not require correction of a filter coefficient by use of a calculation result of a wide range of image feature values, and therefore is able to suppress increase of a calculation cost.

<Second Example Embodiment>

A second example embodiment is an example embodiment of an image signal processing apparatus computing a filter coefficient used for structure-texture decomposition with respect to an image signal with a certain resolution. While number of levels of wavelet transformation according to the present example embodiment is arbitrary, a case of a single level will be described here.

[Image Signal Processing Apparatus According to Present Example Embodiment]

Figure 3:
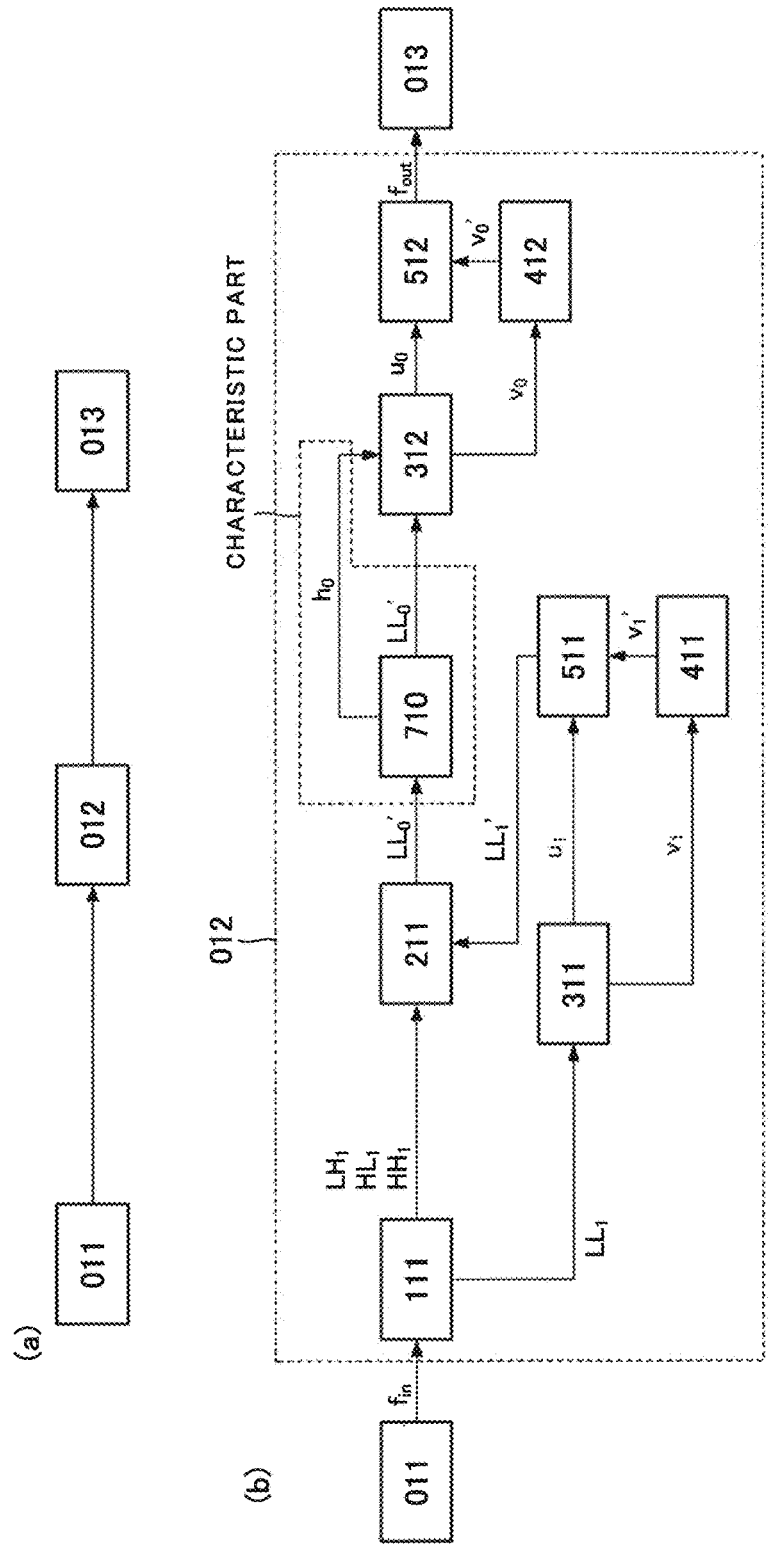
FIG. 3 is conceptual diagrams illustrating an image signal processing apparatus according to a second example embodiment.

FIG. 3 is conceptual diagrams illustrating an image signal processing apparatus according to the second example embodiment.

As illustrated in a part (a) of the diagram, the image signal processing apparatus according to the present example embodiment includes an image signal input unit 011, an image signal processing unit 012, and an image signal output unit 013.

The image signal input unit 011 outputs an input image signal of an original image to the image signal processing unit 012. For example, the image signal input unit 011 is connected to imaging equipment such as a camera and a scanner, an image database accumulating image data captured by the imaging equipment, a network connected to the imaging equipment and the database, or the like, and an original image signal is input from the equipment or the like.

The image signal processing unit 012 performs denoising processing on an input image signal of an original image and outputs a corrected image signal undergoing the denoising processing to the image signal output unit 013.

The image signal output unit 013 outputs an image signal undergoing denoising processing to the outside. For example, the outside includes a display, a printer, storage media such as a hard disk and a memory card that hold image data, a network connected to the apparatuses and the media, and the like, and display, accumulation, or transmission of an image is performed by the apparatuses, the media, or the network.

As illustrated in a part (b) of the diagram, the image signal processing unit 012 includes a WT unit 111, an IWT unit 211, a first STD unit 311, and a second STD unit 312. The image signal processing unit 012 further includes a first TC shrinkage unit 411, a second TC shrinkage unit 412, a first combining unit 511, a second combining unit 512, and a filter coefficient computation unit 710.

Difference from the first example embodiment is enclosed in dotted lines and indicated as "CHARACTERISTIC PART" in the part (b) of the diagram.

An operation of each unit will be described below.

The WT unit 111 applies a single-level wavelet transformation to an original image signal $f_{in}$ input from the image signal input unit 011 to compute a low-frequency component $LL_1$ and high-frequency components $LH_1$, $HL_1$, and $HH_1$ of the wavelet transformation. Then, the WT unit 111 outputs the low-frequency component $LL_1$ to the first STD unit 311, and the high-frequency components $LH_1$, $HL_1$, and $HH_1$ to the IWT unit 211.

The low-frequency component $LL_1$ is an image signal with a resolution one level lower than the original image signal $f_{in}$ in terms of wavelet transformation.

For example, the first STD unit 311 applies the DTVF described in NPL 2 to a low-frequency component $LL_1$ of a wavelet transformation input from the WT unit 111 to separate the low-frequency component $LL_1$ into a structure component $u_1$ and a texture component $v_1$. Then, the first STD unit 311 outputs the structure component $u_1$ to the first combining unit 511, and the texture component $v_1$ to the first TC shrinkage unit 411.

The first TC shrinkage unit 411 applies processing of suppressing a noise component to a texture component $v_1$ input from the first STD unit 311 to generate a noise-suppressed texture component $v_1'$. While the noise suppression processing includes various methods, simple processing such as equation (1) or (2) may be applied, or a nonlinear low-pass filter used in the first STD unit 311 with a modified parameter may be applied. Then, the first TC shrinkage unit 411 outputs the generated texture component $v_1'$ to the first combining unit 511.

The first combining unit 511 combines a structure component $u_1$ input from the first STD unit 311 with a noise-suppressed texture component $v_1'$ input from the first TC shrinkage unit 411 to generate a corrected low-frequency component $LL_1'$.

$$LL_1' = u_1 + v_1' \qquad (10)$$

Then, the first combining unit 511 outputs the corrected low-frequency component $LL_1'$ to the IWT unit 211.

The IWT unit 211 generates a noise-removed reconstructed image signal $LL_0'$ from a corrected low-frequency component $LL_1'$ input from the first combining unit 511 and corrected high-frequency components $LH_1'$, $HL_1'$, and $HH_1'$ input from the WT unit 111, by use of inverse wavelet transformation. The reconstructed image signal $LL_0'$ is an image with the same resolution as that of an input image $f_{in}$. Then, the IWT unit 211 outputs the noise-removed reconstructed image signal $LL_0'$ to the filter coefficient computation unit 710.

The filter coefficient computation unit 710 computes a set of filter coefficients $h_0$, that is, a set of filter coefficients $h_0 = \{h_\alpha | \alpha \in \Omega_{LL0}'\}$ computed by equations (6) and (7) in the DTVF, by use of an input reconstructed image signal $LL_0'$. The filter coefficient computation unit 710 outputs the set of filter coefficients $h_0 = \{h_\alpha | \alpha \in \Omega_{LL0}'\}$ to the second STD unit 312. Note that $h_\alpha$ denotes a computed filter coefficient at a pixel position $\alpha$, and a filter coefficient of the center of $h_\alpha$ is denoted as $h_{\alpha\alpha}$ in equation (6), and a filter coefficient of a position other than the center is denoted as $h_{\alpha\beta}$ in equation (7). Further, $\Omega_{LL1}$ denotes a position of each coefficient of a low-frequency component $LL_1$ of a wavelet transformation.

The processing performed by the first STD unit 311 and the second STD unit 312 is not limited to the structure-texture decomposition described in NPL 2, and may be processing applying a nonlinear low-pass filter such as a bilateral filter or an epsilon filter.

The reconstructed image signal $LL_0'$ is output to the second STD unit 312.

By applying the DTVF in NPL 5, the second STD unit 312 separates a corrected reconstructed image signal $LL_0'$ into a structure component $u_0$ and a texture component $v_0$, from a set of filter coefficients $h_0$ input from the filter coefficient computation unit 710 and the corrected reconstructed image signal $LL_0'$ input from the IWT unit 211. Then, the second STD unit 312 outputs the structure component $u_0$ to the second combining unit 512, and the texture component $v_0$ to the second TC shrinkage unit 412.

Similarly to the first TC shrinkage unit 411, the second TC shrinkage unit 412 applies processing of suppressing a noise component to a texture component $v_0$ input from the second STD unit 312 to generate a noise-suppressed texture component v'. Then, the second TC shrinkage unit 412 outputs the generated texture component $v_0'$ to the second combining unit 512.

Similarly to the first combining unit 511, the second combining unit 512 combines a structure component $u_0$ input from the second STD unit 312 with a noise-suppressed texture component $v_0'$ input from the second TC shrinkage unit 412 to generate an output image $f_{out}$. Then, the second combining unit 512 outputs generated $f_{out}$ to the image signal output unit 013.

[Image Signal Processing Method According to Present Example embodiment]

Next, an image signal processing method according to the present example embodiment will be described.

Figure 4:
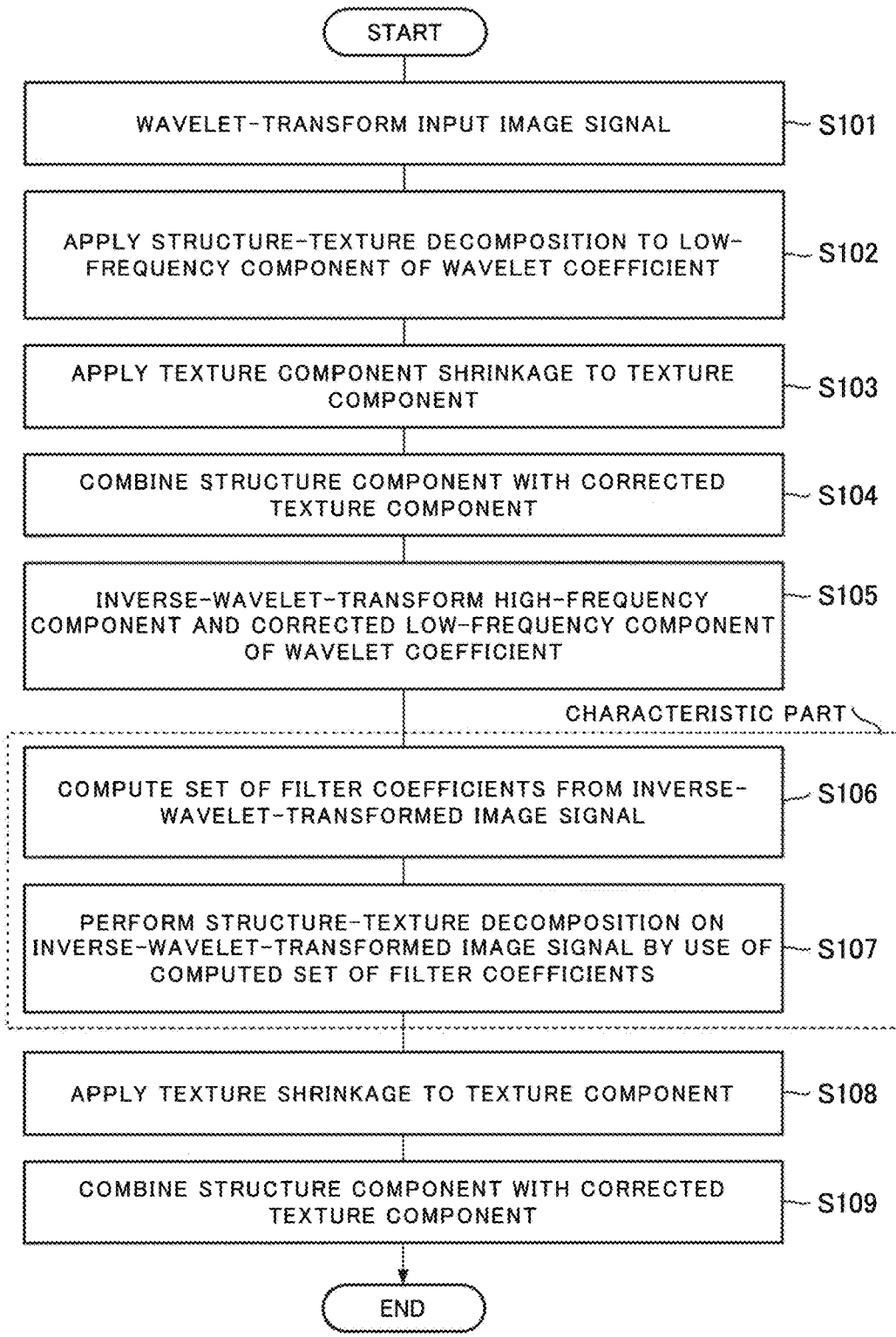
FIG. 4 is a flowchart illustrating an operation in an image signal processing method according to the second example embodiment.

FIG. 4 is a flowchart illustrating an operation in the image signal processing method according to the second example embodiment.

First, the WT unit 111 applies a wavelet transformation to an input image to obtain a low-frequency component and a high-frequency component of the input image (S101). The first STD unit 311 applies structure-texture decomposition to the low-frequency component obtained by the wavelet transformation, by the procedure described in relation to the unit, to obtain a structure component and a texture component of the low-frequency component (S102). Additionally, the first TC shrinkage unit 411 obtains a noise-suppressed texture component from the texture component of the low-frequency component by the procedure described in relation to the unit (S103). Then, the first combining unit 511 combines the structure component of the low-frequency component with the noise-suppressed texture component by the procedure described in relation to the unit, to obtain a corrected low-frequency component (S104). By use of the thus corrected low-frequency component and the high-frequency component, the IWT unit 211 obtains a reconstructed image signal by applying an inverse wavelet transformation (S105). Next, the filter computation unit 710 computes a set of filter coefficients by use of the reconstructed image signal (S106). Then, the second STD unit 312 applies the procedure described in relation to the unit to the reconstructed image signal to perform structure-texture decomposition by use of the set of filter coefficients computed in S106, and obtains a structure component and a texture component of the reconstructed image signal (S107). Additionally, the second TC shrinkage unit 412 applies the procedure described in relation to the unit to the texture component of the reconstructed image signal to obtain a noise-suppressed texture component (S108). Then, the second combining unit 512 combines the structure component of the reconstructed image signal with the noise-suppressed texture component of the reconstructed image signal to generate an output image signal (S109).

As is obvious from the description above, each unit may be configured with hardware but may also be provided by a computer program. In this case, a function and an operation similar to those according to the aforementioned example embodiment are provided by a processor operated by a program stored in a program memory. Further, only part of the functions according to the aforementioned example embodiment may be provided by the computer program.

[Effect of Present Example Embodiment]

The image signal processing apparatus according to the present example embodiment is able to compute a filter coefficient used for structure-texture decomposition in denoising processing, from an image with less noise than that in an original image, being generated by use of wavelet transformation. A low-frequency component in a wavelet transformation is an image signal with a resolution lower than that of an image signal of the original image. A filter coefficient computed from the image signal with a resolution lower than that of the original image is generated by referring to a wider range of pixel values compared with a filter coefficient computed from an image signal with the same resolution as that of the original image signal. Further, noise in the image signal with a resolution lower than that of the original image is more suppressed than noise in the image with the resolution concerned, and therefore influence of noise in filter coefficient computation is less, compared with the image signal with the same resolution as that of the original image signal. Accordingly, obtaining a filter coefficient used in structure-texture decomposition, in accordance with the low-frequency component, reduces the likelihood of setting a filter coefficient that blurs, due to the influence of noise, an edge constituting the image. Consequently, noise in the low-frequency component can be effectively suppressed while preserving an edge component included in the low-frequency component. Additionally, when an image with the same resolution as the original image is generated from the noise-suppressed low-frequency component by use of inverse wavelet transformation, noise in the image is more suppressed than that in the original image, and therefore influence of noise in filter coefficient computation is less, compared with the original image signal. Accordingly, the likelihood of setting a filter coefficient that blurs, due to the influence of noise, an edge constituting the image is reduced, and noise can be effectively suppressed while preserving the edge component. In addition, the image signal processing apparatus according to the present example embodiment does not require correction of a filter coefficient by use of a calculation result of a wide range of image feature values, and therefore is able to suppress increase of a calculation cost.

<Third Example Embodiment>

A third example embodiment is an example embodiment of an image signal processing apparatus computing a filter coefficient in structure-texture separation with respect to an image signal with a certain resolution by use of a filter coefficient computed from a low-resolution low-frequency component. While number of levels of wavelet transformation is arbitrary, a case of a single level will be described here.

[Image Signal Processing Apparatus According to Present Example Embodiment]

Figure 5:
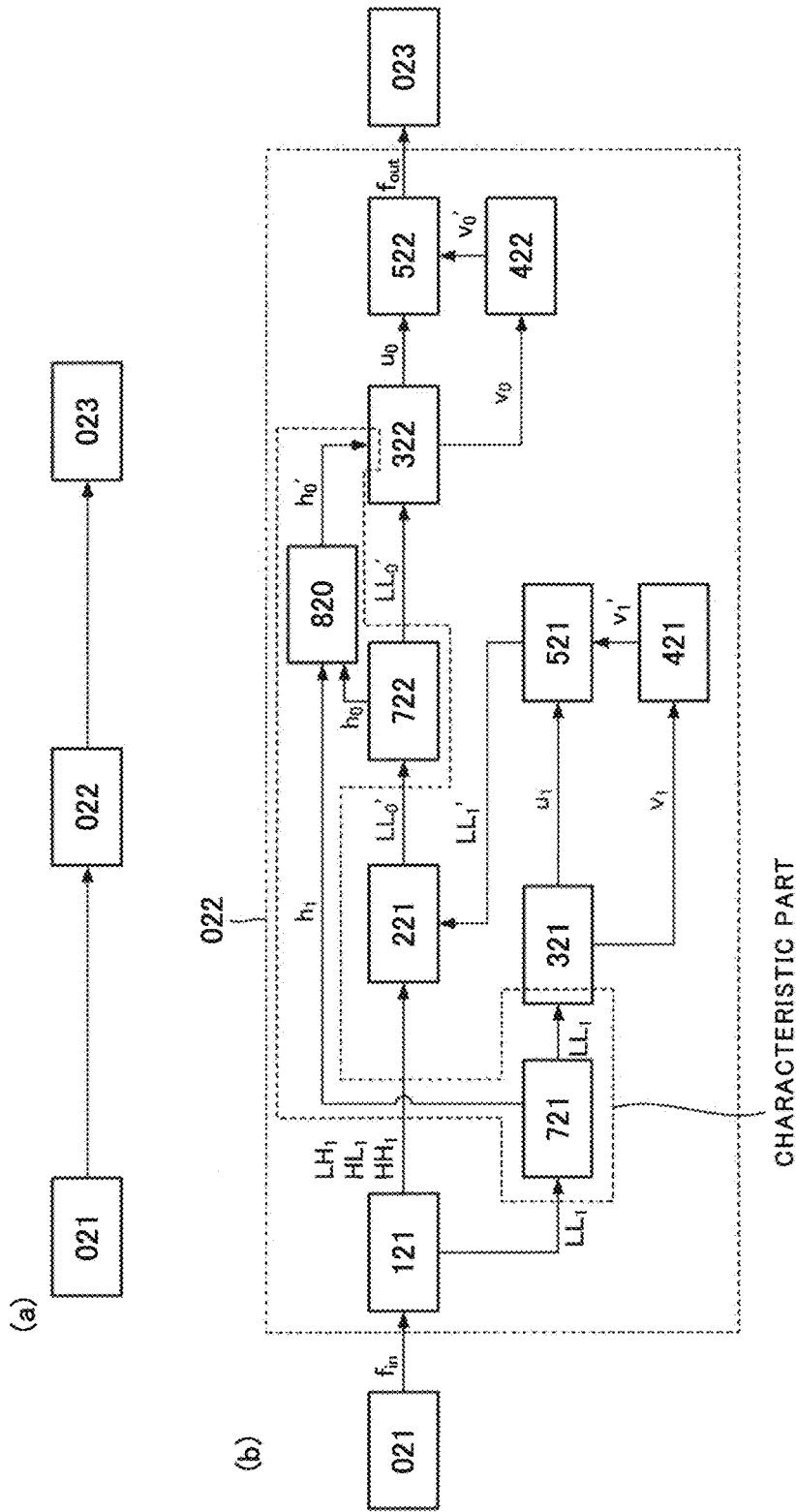
FIG. 5 is conceptual diagrams illustrating an image signal processing apparatus according to a third example embodiment.

FIG. 5 is conceptual diagrams illustrating an image signal processing apparatus according to the third example embodiment.

As illustrated in a part (a) of the diagram, the image signal processing apparatus according to the present example embodiment includes an image signal input unit 021, an image signal processing unit 022, and an image signal output unit 023.

The image signal input unit 021 outputs an input image signal of an original image to the image signal processing unit 022. For example, the image signal input unit 021 is connected to imaging equipment such as a camera and a scanner, an image database accumulating image data captured by the imaging equipment, a network connected to the imaging equipment and the database, or the like, and an original image signal is input from the equipment or the like.

The image signal processing unit 022 performs denoising processing on an input image signal of an original image and outputs a corrected image signal undergoing the denoising processing to the image signal output unit 023.

The image signal output unit 023 outputs an image signal undergoing denoising processing to the outside. For example, the outside includes a display, a printer, storage media such as a hard disk and a memory card that hold image data, a network connected to the apparatuses and the media, and the like, and display, accumulation, or transmission of an image is performed by the apparatuses, the media, or the network.

As illustrated in a part (b) of the diagram, the image signal processing unit 022 includes a WT unit 121, an IWT unit 221, a first STD unit 321, a second STD unit 322, a first TC shrinkage unit 421, and a second TC shrinkage unit 422. The image signal processing unit 022 further includes a first combining unit 521, a second combining unit 522, a first filter coefficient computation unit 721, a second filter coefficient computation unit 722, and a filter coefficient combining unit 820.

Difference from the second example embodiment is enclosed in dotted lines and indicated as "CHARACTERISTIC PART" in the part (b) of the diagram.

Description of a part common with the second example embodiment will be omitted, and the characteristic part will be mainly described below.

The first filter coefficient computation unit 721 computes a set of filter coefficients $h_1$ by use of a low-frequency component $LL_1$ separated by wavelet transformation input from the WT unit 121 and outputs the set of filter coefficients $h_1$ to the filter coefficient combining unit 820. The set of filter coefficients $h_1$ is a set of filter coefficients $h_1 = \{h_\alpha | \alpha \in \Omega_{LL1}\}$ computed by equations (6) and (7) in a DTVF. Note that $h_\alpha$ denotes a filter coefficient computed at a pixel position $\alpha$, and a filter coefficient of the center of $h_\alpha$ is denoted as $h_{\alpha\alpha}$ in equation (6), and a filter coefficient of a position other than the center is denoted as $h_{\alpha\beta}$ in equation (7). Further, $\Omega_{LL1}$ denotes a position of each coefficient of the low-frequency component $LL_1$ of the wavelet transformation. Without being limited to the structure-texture decomposition in NPL 2, the STD unit may apply a non-linear low-pass filter such as a bilateral filter or an epsilon filter.

When using a bilateral filter or an epsilon filter, the first filter coefficient computation unit outputs a set of filters computed for each pixel position to the filter coefficient combining unit 820, similarly to the case with the DTVF.

The low-frequency component $LL_1$ is output to the first STD unit 321.

The IWT unit 221 generates a noise-removed reconstructed image signal $LL_0'$ from a corrected low-frequency component $LL_1'$ input from the first combining unit 521 and high-frequency components $LH_1$, $HL_1$, and $HH_1$ input from the WT unit 121, by use of inverse wavelet transformation. The reconstructed image signal $LL_0'$ is an image with the same resolution as that of an input image $f_{in}$. Then, the IWT unit 221 outputs the noise-removed reconstructed image signal $LL_0'$ to the second filter coefficient computation unit 722.

The second filter coefficient computation unit 722 computes a set of filter coefficients $h_0$ by use of the input reconstructed image signal $LL_0'$. The computation method is the same as the computation method of filter coefficients in the first filter coefficient computation unit 721. The filter coefficient $h_0$ is output to the filter coefficient combining unit 820.

Further, the reconstructed image signal $LL_0'$ is output to the second STD unit 322.

The filter coefficient combining unit 820 combines a set of filter coefficients $h_0$ with a set of filter coefficients $h_1$ to generate a set of filter coefficients $h_0'$. The set of filter coefficients $h_0'$ is output to the second STD unit 322.

The method of combining the set of filter coefficients $h_0$ with the set of filter coefficients $h_1$ in the filter coefficient combining unit 820 is as follows.

It is assumed in the DTVF that filter coefficients at a pixel position $\alpha=(i,j)$ computed from the reconstructed image signal $LL_0'$ by equations (6) and (7) are denoted as $h_{0,\alpha\alpha}$ and $h_{0\alpha\beta}$. It is further assumed in the set of filter coefficients $h_1$ input from the first STD unit 321 that filter coefficients at a pixel position $\alpha'=(i/2, j/2)$ and a neighborhood pixel thereof $\beta' \in N(\alpha')$ are respectively denoted as $h_{1,\alpha'\alpha'}$ and $h_{1,\alpha'\beta'}$. Then, the filter coefficients used in the DTVF at this level are combined as expressed by equations (11) and (12) below.

$$h'_{0,\alpha\alpha} = c_0 \times h_{0,\alpha\alpha} + (1-c_0) \times h_{1,\alpha'\alpha'} \quad (11)$$

$$h'_{0,\alpha\beta} = c_0 \times h_{0,\alpha\beta} + (1-c_0) \times h_{1,\alpha'\beta'} \quad (12)$$

Note that $c_0$ denotes a combining ratio of the filter coefficients where $0 \leq c_0 < 1$. The meaning of the combining will be described. The TV method has a problem that, since a weak edge in which a variation of pixel values between adjacent pixels is comparable to noise cannot be distinguished from noise, such an edge cannot be clearly preserved in an output image. In order to solve the problem, as described in NPL 6, it is effective to estimate an edge by analyzing a variation of a wide range of pixel values in addition to a variation of local pixel values, and limit a filtering direction in the TV method to a direction along the edge.

However, the technology in NPL 6 requires additional wide-range filtering processing for variation analysis of a wide range of pixel values, posing a problem from a calculation cost viewpoint.

Filter coefficients constituting the set of filter coefficients $h_1$ of the DTVF, being computed from a low-frequency component at a level lower than the level concerned, are filter coefficients obtained from an analysis result of a variation of a wider range of pixel values compared with the level concerned. In other words, the filter has such a characteristic that a filter coefficient generated in a flat region is likely to undergo intense smoothing, and, in a region where an edge exists, a coefficient along a direction of the edge is likely to be intensely weighted. Further, a wavelet transformation generates a low-frequency component by a low-pass filter, and therefore influence of noise in a low-frequency component at a level lower than the level concerned is less than that at the level concerned. Accordingly, influence of noise on the filter coefficient $h_1$ is little. By combining a filter coefficient generated at a level lower than the level concerned with a filter coefficient at the level concerned, a filter coefficient in consideration of a variation of a wide range of pixel values can be generated to improve edge preservation performance in the DTVF processing. Further, the additional wide-range filtering processing required in the technology in NPL 6 is not required, and therefore the problem from a calculation cost viewpoint can also be solved.

The combining ratio $c_0$ used in equations (11) and (12) may be given as a parameter set by a user or an adaptively determined value. For example, a variance of pixel values of a pixel of interest and pixels peripheral thereto may be calculated, and a weight of a filter coefficient with a resolution lower than the resolution concerned may be set greater for a region with a smaller variance.

The second STD unit 322 performs separation into a structure component $u_0$ and a texture component $v_0$ by applying a technique improving the DTVF in NPL 5. The separation is performed on the basis of the set of filter coefficients $h_0'$ input from the filter coefficient combining unit 820 and the corrected reconstructed image signal $LL_0'$ input from the IWT unit 221. Then, the second STD unit 322 outputs the structure component $u_0$ to the second combining unit 522, and the texture component $v_0$ to the TC shrinkage unit 422.

The second filter coefficient computation unit 722 and the filter coefficient combining unit 820 may be integrated. Further, the filter coefficient combining unit 810 and the second STD unit 322 may be integrated. The second filter coefficient computation unit 722, the filter coefficient combining unit 820, and the second STD unit may be integrated.

[Image Signal Processing Method According to Present Example Embodiment]

Next, an image signal processing method according to the present example embodiment will be described.

Figure 6:
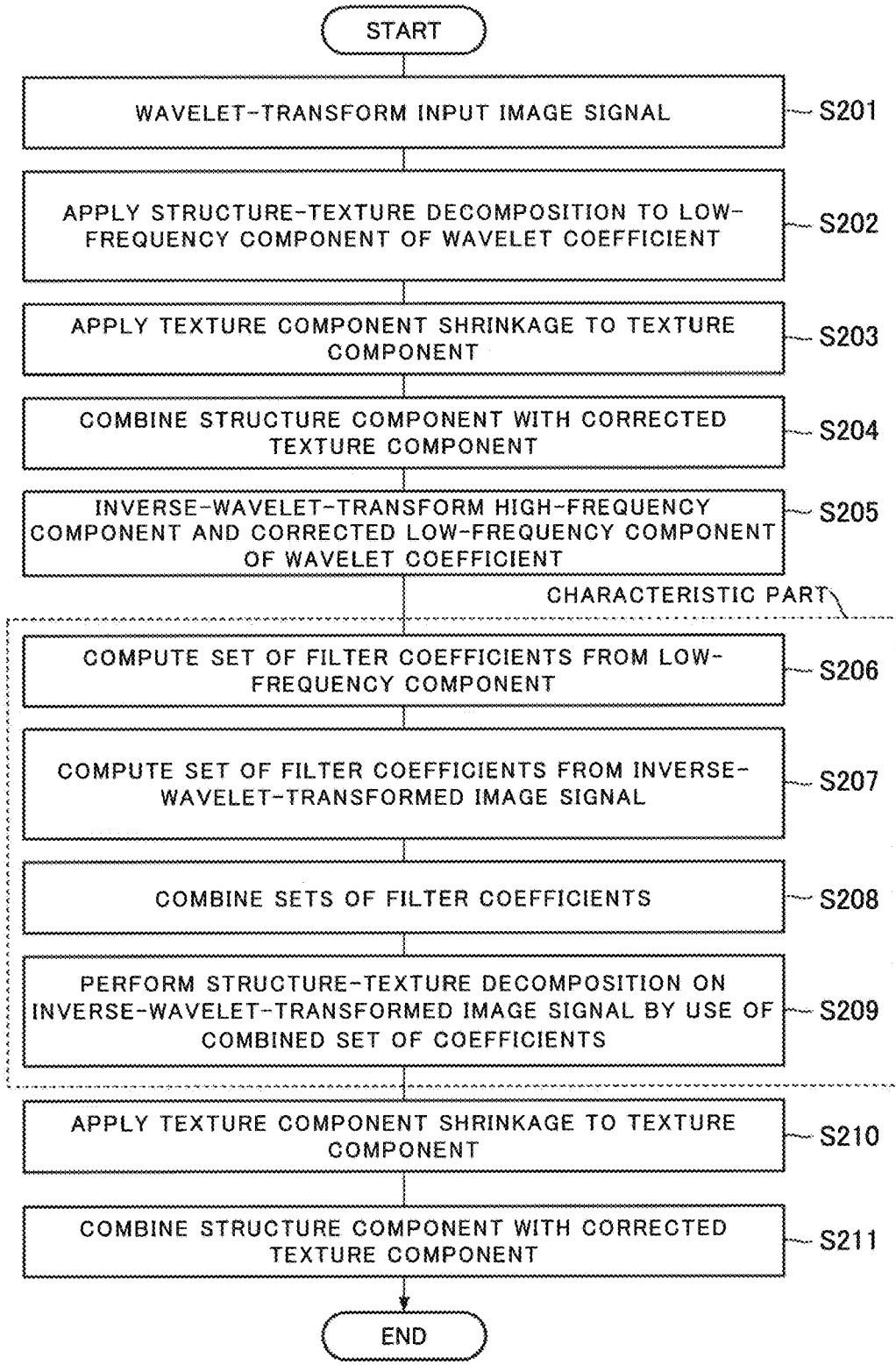
FIG. 6 is a flowchart illustrating an operation in an image signal processing method according to the third example embodiment.

FIG. 6 is a flowchart illustrating an operation in the image signal processing method according to the third example embodiment.

First, the WT unit 121 applies a wavelet transformation to an input image to obtain a low-frequency component and a high-frequency component of the input image (S201). The first STD unit 321 applies structure-texture decomposition to the low-frequency component obtained by the wavelet transformation, by the procedure described in relation to the unit, to obtain a structure component and a texture component of the low-frequency component (S202). Additionally, the first TC shrinkage unit 421 obtains a noise-suppressed texture component from the texture component of the low-frequency component by the procedure described in relation to the unit (S203). Then, the first combining unit 521 combines the structure component of the low-frequency component with the noise-suppressed texture component by the procedure described in relation to the unit to obtain a corrected low-frequency component (S204). The IWT unit 221 applies an inverse wavelet transformation by use of the thus corrected low-frequency component and the high-frequency component to obtain a reconstructed image signal (S205). The first filter coefficient computation unit 721 computes a set of filter coefficients by use of the low-frequency component (S206). The second filter coefficient computation unit 722 computes a set of filter coefficients by use of the reconstructed image signal (S207). The filter coefficient combining unit 820 combines the filter coefficients obtained by use of the low-frequency component with the filter coefficients obtained by use of the reconstructed image signal (S208). The second STD unit 322 performs structure-texture decomposition applying the procedure described above in relation to the unit on the reconstructed image signal to obtain a structure component and a texture component of the reconstructed image signal (S209). Additionally, the second TC shrinkage unit 422 applies the procedure described in relation to the unit to the texture component of the reconstructed image signal to obtain a noise-suppressed texture component (S210). Then, the second combining unit 522 combines the structure component of the reconstructed image signal with the noise-suppressed texture component of the reconstructed image signal to generate an output image signal (S211).

As is obvious from the description above, each unit may be configured with hardware but may also be provided by a computer program. In this case, a function and an operation similar to those according to the aforementioned example embodiment are provided by a processor operated by a program stored in a program memory. Further, only part of the functions according to the aforementioned example embodiment may be provided by the computer program.

[Effect of Present Example Embodiment]

The image signal processing apparatus according to the present example embodiment generates a filter coefficient used for structure-texture decomposition by combining filter coefficients computed from a low-frequency component obtained by applying a wavelet transformation to an image signal. The low-frequency component is an image signal with a resolution lower than that of an image signal of an original image. A filter coefficient computed from the image signal with a resolution lower than that of the original image is generated by referring to a wider range of pixel values compared with a filter coefficient computed from an image signal with the same resolution as that of the original image signal. Further, noise in the image signal with a resolution lower than that of the original image is more suppressed than noise in the image with the resolution concerned, and therefore influence of noise in filter coefficient computation is less, compared with the image signal with the same resolution as that of the original image signal. Accordingly, the likelihood of setting a filter coefficient that blurs, due to the influence of noise, an edge constituting the image is reduced. In addition, the image signal processing apparatus according to the present example embodiment does not require calculation of a wide range of image feature values required for correction of a filter coefficient, and therefore is able to suppress increase of a calculation cost.

<Fourth Example Embodiment>

A fourth example embodiment is an example embodiment related to an image signal processing apparatus correcting a set of filters used in structure-texture separation processing by a set of gradient intensities of pixel values of respective points constituting an image (hereinafter referred to as "gradient intensity set").

[Image Signal Processing Apparatus According to Present Example Embodiment]

Figure 7:
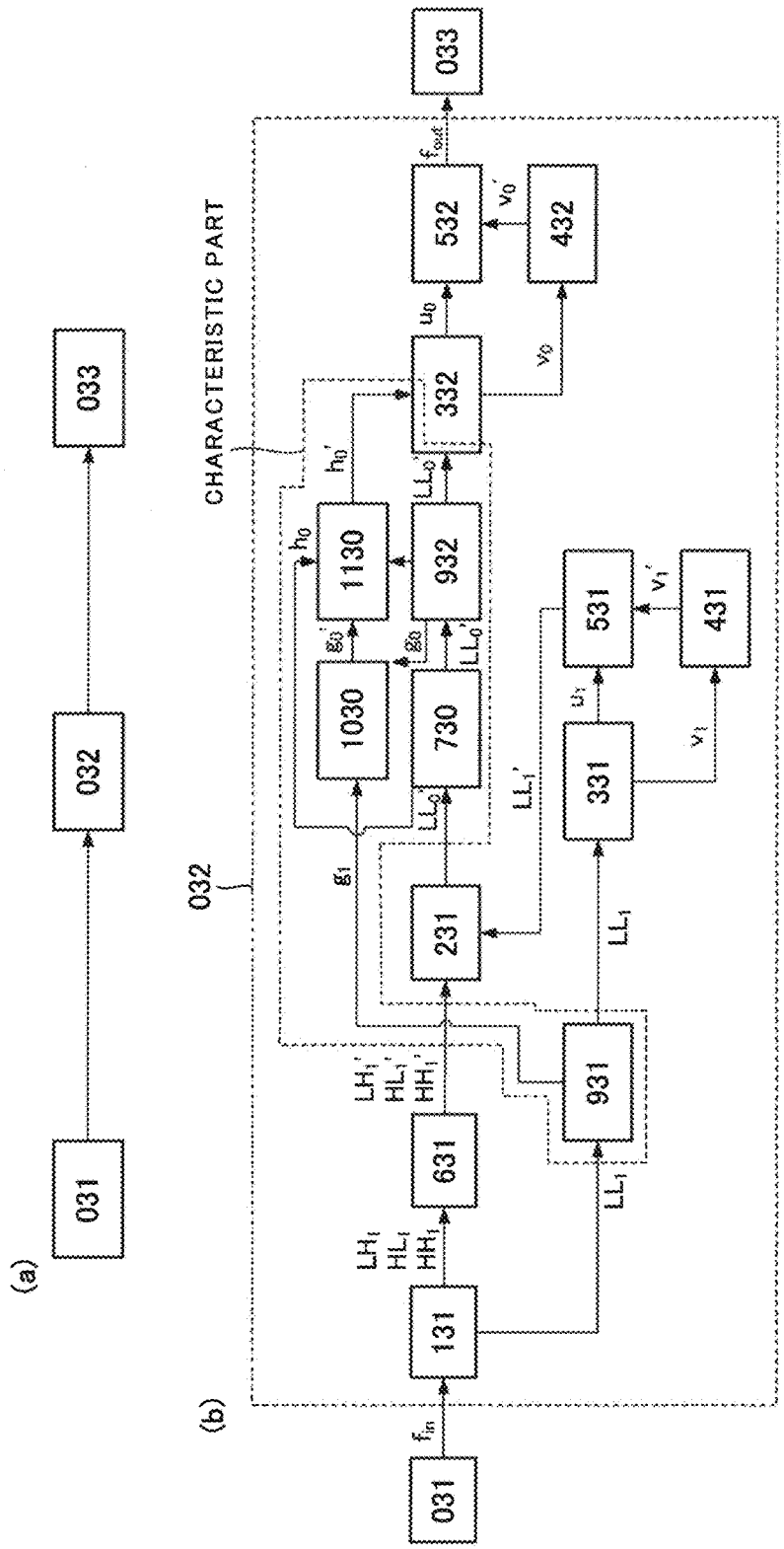
FIG. 7 is conceptual diagrams illustrating an image signal processing apparatus according to a fourth example embodiment.

FIG. 7 is conceptual diagrams illustrating an image signal processing apparatus according to the fourth example embodiment.

As illustrated in a part (a) of the diagram, the image signal processing apparatus according to the fourth example embodiment includes an image signal input unit 031, an image signal processing unit 032, and an image signal output unit 033.

The image signal input unit 031 and the image signal output unit 033 are similar to those in the image signal processing apparatus according to the third example embodiment.

As illustrated in a part (b) of the diagram, the image signal processing unit 032 includes a WT unit 131, an IWT unit 231, a first STD unit 331, a second STD unit 332, a first TC shrinkage unit 431, and a second TC shrinkage unit 432. The image signal processing unit 032 further includes a first combining unit 531, a second combining unit 532, a WC shrinkage unit 631, and a filter coefficient computation unit 730. The image signal processing unit 032 further includes a first gradient intensity computation unit 931, a second gradient intensity computation unit 932, a gradient intensity combining unit 1030, and a filter correction unit 1130. While number of levels of WT transformation is arbitrary, a case of a single level will be described here.

Difference between the present example embodiment and the third example embodiment is enclosed in dotted lines and indicated as "CHARACTERISTIC PART" in the part (b) of the diagram. Accordingly, description of a part common with the third example embodiment is omitted, and the characteristic part will be mainly described.

The filter coefficient computation unit 730 computes a set of filter coefficients $h_0$ by use of a reconstructed image signal $LL_0'$ and outputs the set to the filter correction unit 1130.

The first gradient intensity computation unit 931 computes a gradient intensity set at each point $\alpha$ in an image by use of a low-frequency component $LL_1$ of a wavelet transformation input from the WT unit 131. For example, the gradient intensity set at each point $\alpha$ in the image is a gradient intensity set at each point $\alpha$ in the image computed by the technique in NPL 6 as follows.

$$g_1 = \{g_{\alpha\gamma} | \alpha \in \Omega_{LL_1}, \gamma \in N(\alpha)\}$$

The gradient intensity set $g_1$ is output to the gradient intensity combining unit 1030. The low-frequency component $LL_1$ is output to the first STD unit 331.

The first gradient intensity computation unit 931 and the first STD unit 331 may be integrated.

By use of a reconstructed image signal $LL_0'$, the second gradient intensity computation unit 932 obtains a gradient intensity set at each point $\alpha$ in an image $$g_0 = \{g_{\alpha\gamma} | \alpha \in \Omega_{LL_0'}, \gamma \in N(\alpha)\}$$

by a similar technique, and outputs the set to the gradient intensity combining unit 1030.

The gradient intensity combining unit 1030 combines a gradient intensity set $g_0$ with a gradient intensity set $g_1$ to create a combined gradient intensity set $g_0'$, and outputs the gradient intensity set $g_0'$ to the filter correction unit 1130.

The filter correction unit 1130 corrects a set of filter coefficients $h_0$ by use of a combined gradient intensity set $g_0'$ to create a corrected set of filter coefficients $h_0'$. The corrected set of filter coefficients $h_0'$ is output to the second STD unit 332.

The technique of obtaining a gradient intensity set described in NPL 6 will be described. The technique in NPL 6 introduces a new evaluation axis to the filter coefficient derivation process in the DTVF in NPL 5. Specifically, a filter coefficient $w_{\alpha\gamma}(u)$ of the DTVF before normalization, being computed by a local variation defined by equation (9), is corrected as equation (13) below.

$$w'_{\alpha\gamma}(u) = F(g_{\alpha\gamma}) \times w_{\alpha\gamma}(u) \quad (13)$$

Note that $g_{\alpha\gamma}$ denotes an intensity of a gradient of pixel values in a direction from a pixel $\alpha$ to a pixel $\gamma$ adjacent to the pixel $\alpha$. Then, $g_{\alpha\gamma}$ is computed in accordance with equations (14) and (15) below. In the computation, eigenvalues $\lambda_{\alpha,0}$ and $\lambda_{\alpha,1}$, and eigenvectors $e_{\alpha,0}$ and $e_{\alpha,1}$ of a Harris matrix (structure tensor) in NPL 7 calculated at the pixel $\alpha$ in a low-frequency component $LL_3$ are used.

$$g_{\alpha\gamma} = |\lambda_{\alpha,0} e_{\alpha,0}^T d_{\alpha\gamma}| + |\lambda_{\alpha,1} e_{\alpha,1}^T d_{\alpha\gamma}| \quad (14)$$

$$\text{where } d_{\alpha\gamma} = (\gamma - \alpha)/\|\gamma - \alpha\| \quad (15)$$

An eigenvalue and an eigenvector of the Harris matrix respectively denote a gradient intensity and a gradient direction in a range of several pixels around a pixel of interest.

Further, while the function $F(g_{\alpha\gamma})$ in equation (13) may take various forms, the function may be basically designed so that $F(g_{\alpha\gamma})$ takes a large value when $g_{\alpha\gamma}$ is small, and $F(g_{\alpha\gamma})$ takes a small value when $g_{\alpha\gamma}$ is large. In other words, occurrence of a blur in an edge due to processing that crosses the edge can be suppressed by decreasing a filter coefficient with respect to a direction with a large gradient.

The gradient intensity combining unit 1030 combines a gradient intensity set $g_0$ with a gradient intensity set $g_1$ obtained by the aforementioned technique, by a technique described below.

It is assumed that $g_{\alpha\gamma}$ in equation (14) at a pixel position $\alpha = (i,j)$ are $g_{0,\alpha\gamma}$. Further assuming that a gradient intensity at a pixel position $\alpha' = (i/2, j/2)$ and a neighborhood pixel thereof $\gamma' \in N(\alpha')$ are $g_{1,\alpha'\gamma'}$ with respect to $g_{\alpha\gamma}$ in equation (14) obtained from $LL_1$ in the first gradient intensity computation unit 931, a combined $g_{\alpha\gamma}$ used in filter coefficient correction is expressed as $$g'_{\alpha\gamma} = c_0 g_{0,\alpha\gamma} + (1-c_0) g_{1,\alpha'\gamma'} \quad (16)$$

Note that $c_0$ denotes a combining ratio where $0 \leq c_0 \leq 1$. Further, $c_0$ may be given as a parameter set by a user, or an adaptively determined value. For example, a variance of pixel values of a pixel of interest and pixels peripheral thereto may be calculated, and a weight of a filter coefficient with a resolution lower than the resolution concerned may be set greater for a region with a smaller variance.

The second STD unit 332 performs structure-texture separation on a reconstructed image signal $LL_0'$ by use of a corrected set of filter coefficients $H_0'$.

At least two of the filter coefficient computation unit 730, the second gradient intensity computation unit 732, the gradient intensity combining unit 1030, and the second STD unit may be integrated.

[Image Signal Processing Method According to Present Example Embodiment]

Figure 8:
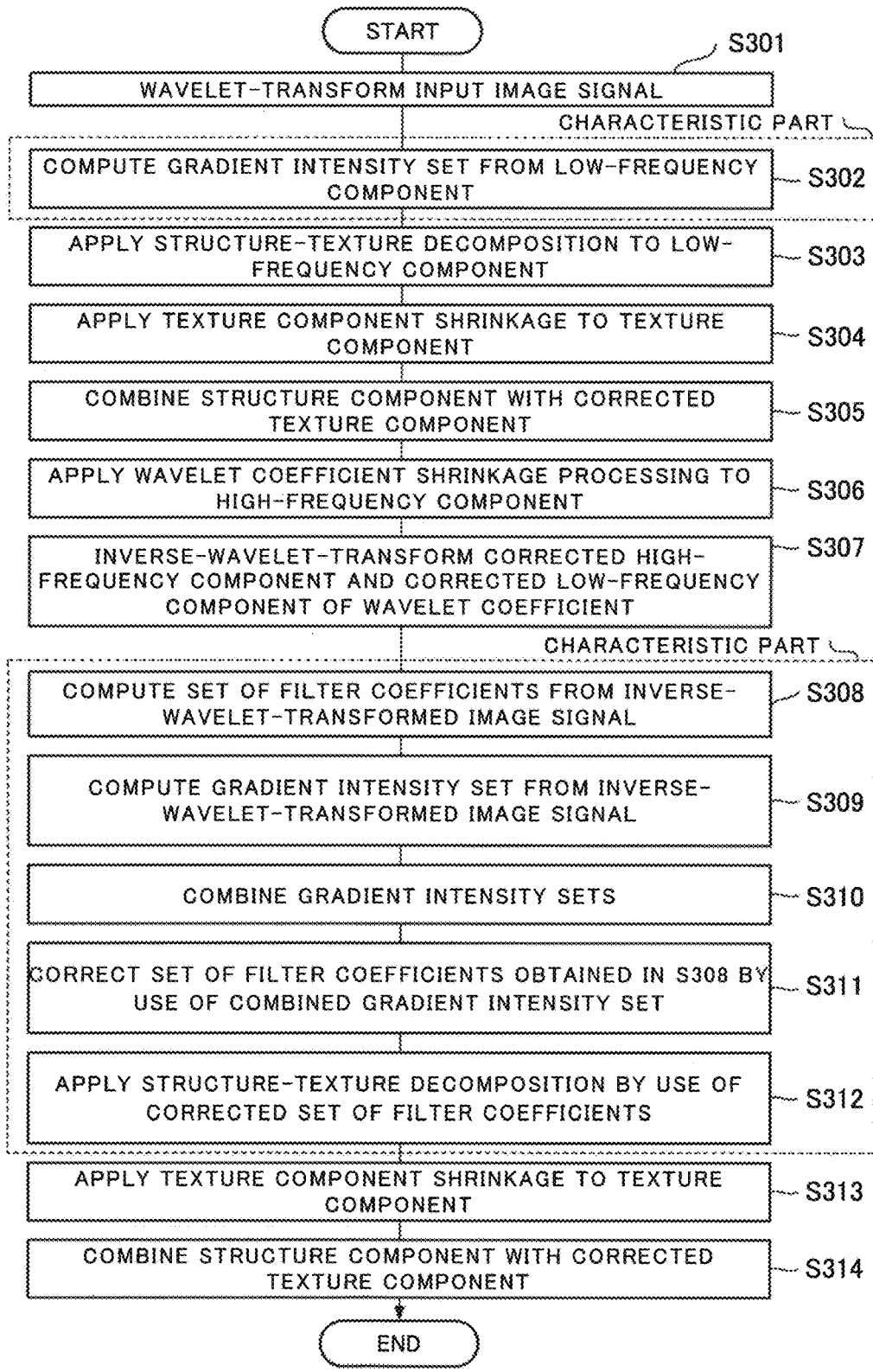
FIG. 8 is a flowchart illustrating an operation in an image signal processing method according to the fourth example embodiment.

FIG. 8 is a flowchart illustrating an operation in an image signal processing method according to the fourth example embodiment. Difference from the image signal processing apparatus according to the third example embodiment is enclosed in dotted lines and indicated as "CHARACTERISTIC PART" in the diagram. Specifically, the difference is as follows.

The first gradient intensity computation unit 931 computes a gradient intensity set from a low-frequency component (S302).

The filter coefficient computation unit 730 computes a set of filter coefficients from an inverse-wavelet-transformed image signal (S308).

The second gradient intensity computation unit 932 computes a gradient intensity set from the inverse-wavelet-transformed image signal (S309).

The gradient intensity combining unit 1030 combines the gradient intensity set computed from the low-frequency component with the gradient intensity set computed from the inverse-wavelet-transformed image signal (S310).

The filter correction unit 1130 corrects the set of filter coefficients obtained in S308 by use of the gradient intensity set combined in S310 (S311).

The second STD unit 332 applies structure-texture decomposition to the inverse-wavelet-transformed image signal by use of the set of filter coefficients corrected in S311 (S312).

[Effect of Present Example Embodiment]

The image signal processing apparatus according to the present example embodiment combines a gradient intensity set computed with respect to a low-frequency component being an image signal with a resolution lower than that of an original image, with a gradient intensity set computed by use of a reconstructed image signal being an image signal with the same resolution as that of the original image. Then, the image signal processing apparatus corrects a set of filter coefficients by use of the combined gradient intensity set. The gradient intensity computed by use of the reconstructed image signal being an image signal with the same resolution as that of the original image is an index for evaluating a local variation between adjacent pixels. Further, the gradient intensity computed with respect to the low-frequency component being an image signal with a resolution lower than that of the original image is an index for evaluating variation of a wide range of pixel values. Accordingly, the corrected filter coefficient considers variation of a wider range of pixel values. Consequently, edge preservation performance can be enhanced so as to prevent blurring of an edge in an image due to noise removal. In addition, the calculation uses an image signal with a resolution lower than that of the original image, and therefore a calculation amount can be reduced to suppress a calculation cost.

<Fifth Example Embodiment>

A fifth example embodiment is a case of performing denoising processing on a high-frequency component obtained by wavelet transformation. While number of levels of wavelet transformation according to the present invention is arbitrary, a case of a single level will be described here.

[Image Signal Processing Apparatus According to Present Example Embodiment]

Figure 9:
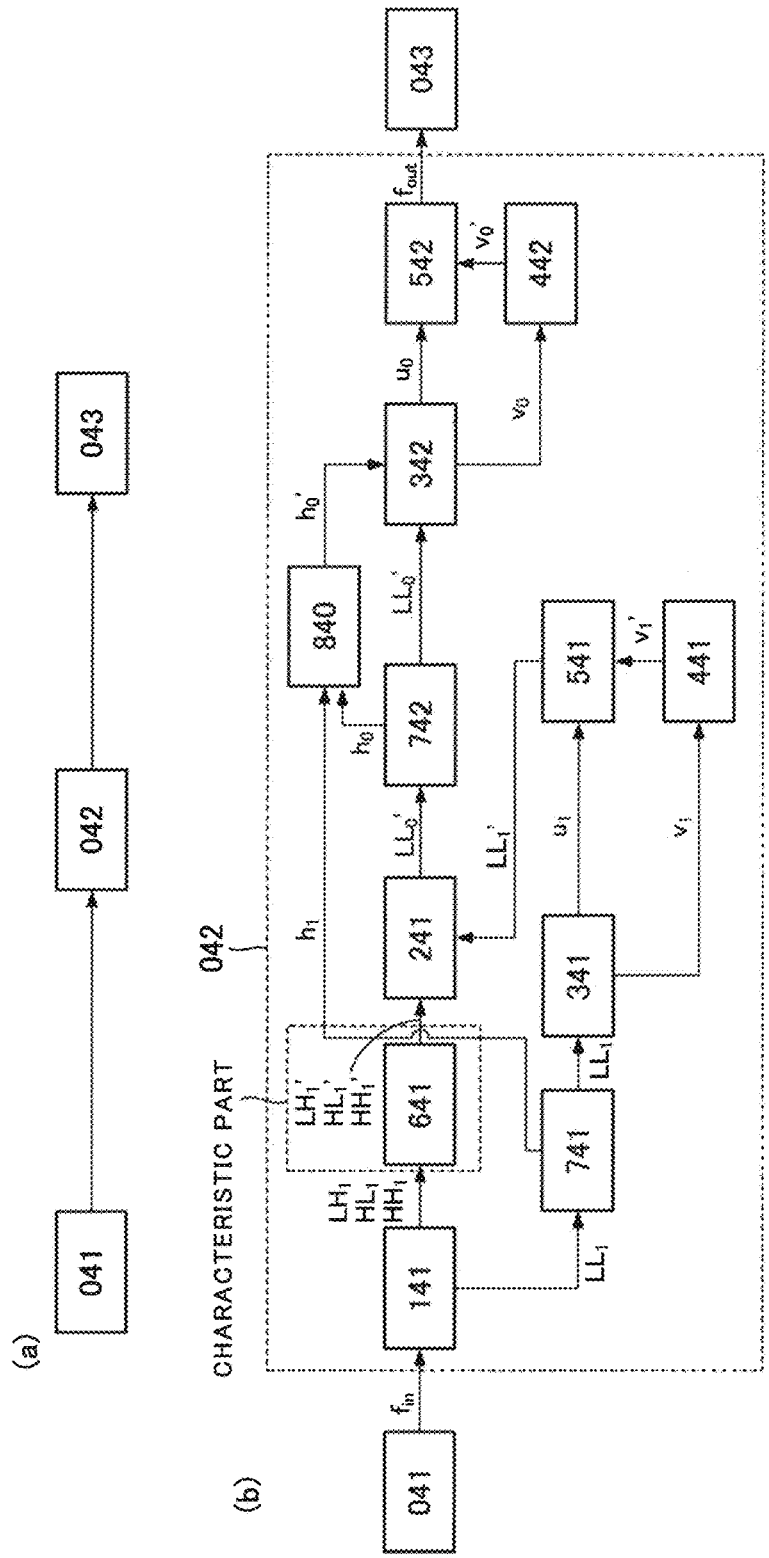
FIG. 9 is conceptual diagrams illustrating an image signal processing apparatus according to a fifth example embodiment.

FIG. 9 is conceptual diagrams illustrating an image signal processing apparatus according to the fifth example embodiment.

As illustrated in a part (a) of the diagram, the image signal processing apparatus according to the present example embodiment includes an image signal input unit 041, an image signal processing unit 042, and an image signal output unit 043.

The image signal input unit 041 and the image signal output unit 043 are similar to the corresponding parts according to the second example embodiment.

As illustrated in a part (b) of the diagram, the image signal processing unit 042 includes a WT unit 141, an IWT unit 241, a first STD unit 341, a second STD unit 342, a first TC shrinkage unit 441, and a second TC shrinkage unit 442. The image signal processing unit 042 further includes a first combining unit 541, a second combining unit 542, and a wavelet coefficient (WC) shrinkage unit 641. The image signal processing unit 042 further includes a first filter coefficient computation unit 741, a second filter coefficient computation unit 742, and a filter coefficient combining unit 840.

Difference from the image signal processing apparatus according to the third example embodiment is enclosed in dotted lines and indicated as "CHARACTERISTIC PART" in the part (b) of the diagram, that is, a part in the WC shrinkage unit 641 where shrinkage processing is performed on a high-frequency component obtained by wavelet transformation in the WT unit. The remaining portion is similar to the case according to the third example embodiment, and therefore description thereof is omitted, and a part related to the aforementioned characteristic part will be described.

The WT unit 141 applies a single-level wavelet transformation to an original image signal $f_{in}$ input from the image signal input unit 041 to compute a low-frequency component $LL_1$ and high-frequency components $LH_1$, $HL_1$, and $HH_1$ of the wavelet transformation. Then, the WT unit 141 outputs the low-frequency component $LL_1$ to the first STD unit 341, and the high-frequency components $LH_1$, $HL_1$, and $HH_1$ to the WC shrinkage unit 641.

The WC shrinkage unit 641 applies the shrinkage processing by equation (1) or (2) to high-frequency components $LH_1$, $HL_1$, and $HH_1$ of a wavelet transformation input from the WT unit 141 to compute corrected high-frequency components $LH_1'$, $HL_1'$, and $HH_1'$. Then, the WC shrinkage unit 641 outputs the corrected high-frequency components $LH_1'$, $HL_1'$, and $HH_1'$ to the IWT unit 241.

The IWT unit 241 generates a noise-removed reconstructed image signal $LL_0'$ by use of inverse wavelet transformation. The generation is performed on the basis of a corrected low-frequency component $LL_1'$ input from the first combining unit 541 and corrected high-frequency components $LH_1'$, $HL_1'$, and $HH_1'$ input from the WC shrinkage unit 641. The reconstructed image signal $LL_0'$ is an image with the same resolution as that of an input image $f_{in}$. Then, the IWT unit 241 outputs the noise-removed reconstructed image signal $LL_0'$ to the second STD unit 342.

[Image Signal Processing Method According to Present Example Embodiment]

Figure 10:
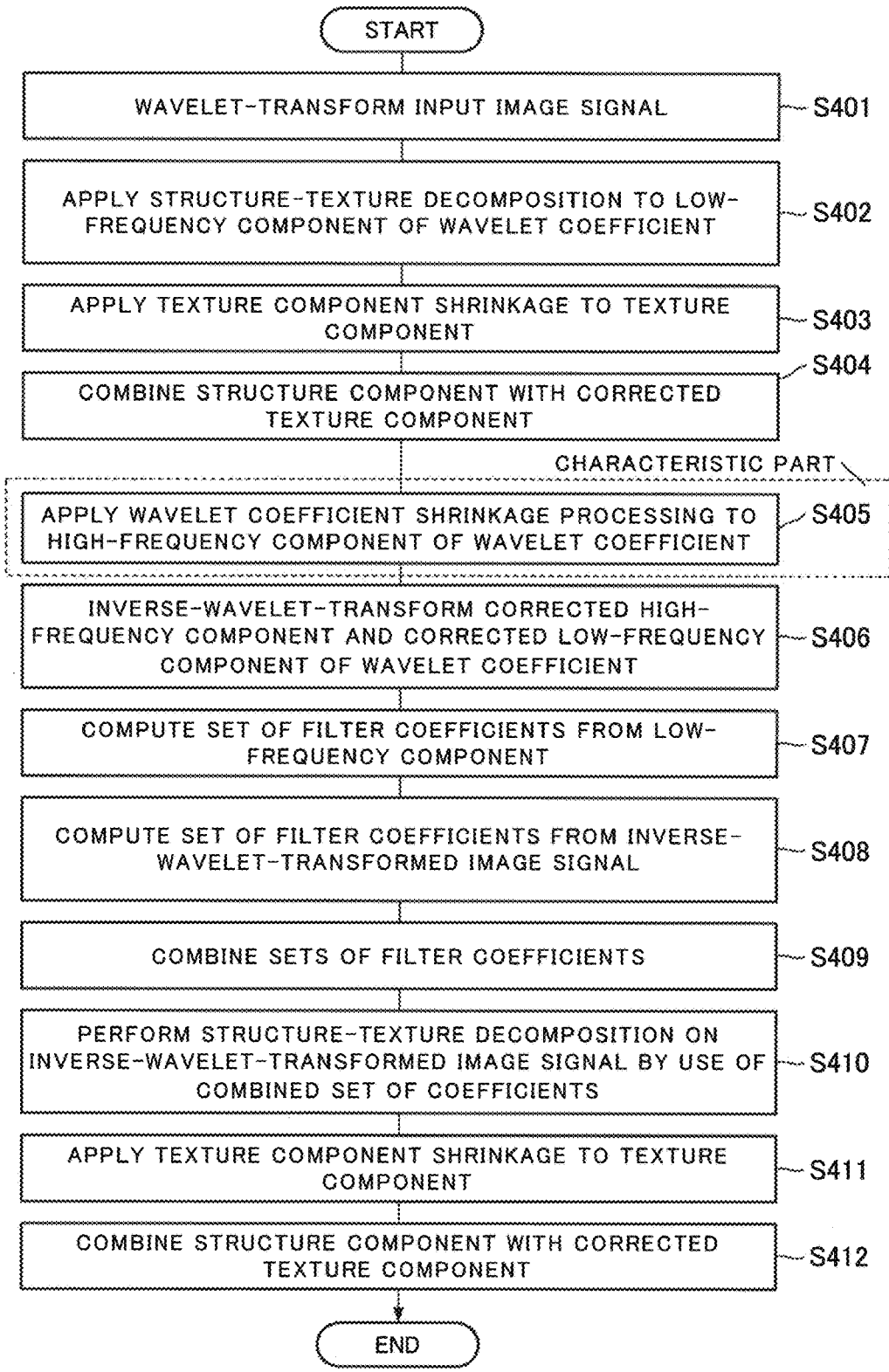
FIG. 10 is a flowchart illustrating an operation in an image signal processing method according to the fifth example embodiment.

FIG. 10 is a flowchart illustrating an operation in the image signal processing method according to the fifth example embodiment. Difference from the image signal processing apparatus according to the third example embodiment is enclosed in dotted lines and indicated as "CHARACTERISTIC PART" in the diagram. That is to say, the difference is that the WC shrinkage unit 641 according to the present example embodiment applies shrinkage processing to a high-frequency component obtained by a wavelet transformation to obtain a corrected high-frequency component (S405).

[Effect of Present Example Embodiment]

First, the same effect as the third example embodiment can be obtained by the present example embodiment. In addition, the present example embodiment performs denoising processing on a wavelet-transformed high-frequency component as well, and therefore is able to obtain an image signal with yet less noise.

<Sixth Example Embodiment>

A sixth example embodiment modifies the wavelet transformation according to the fifth example embodiment to multistep.

[Image Signal Processing Apparatus According to Present Example Embodiment]

Figure 11:
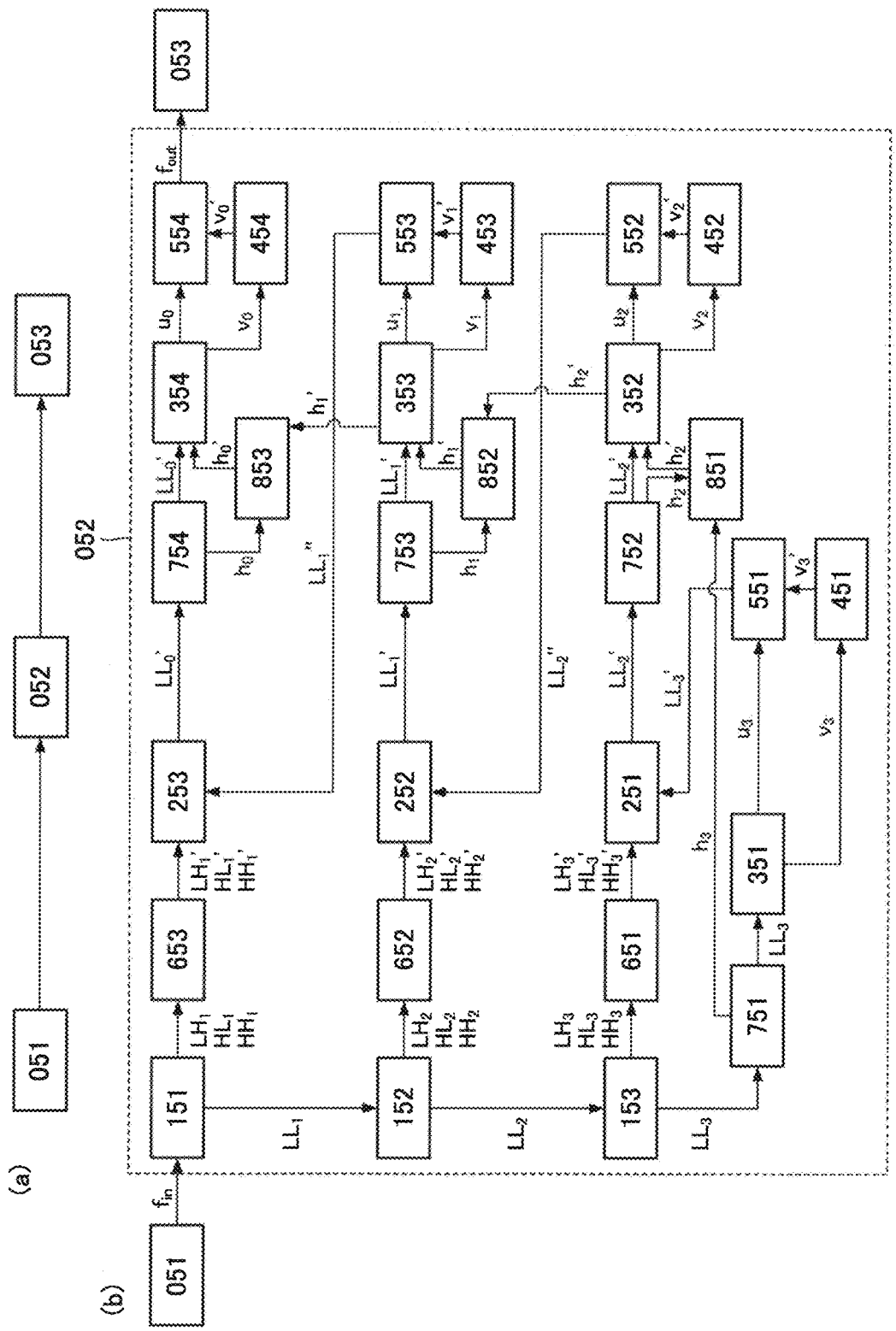
FIG. 11 is conceptual diagrams illustrating an image signal processing apparatus according to a sixth example embodiment.

FIG. 11 is conceptual diagrams illustrating an image signal processing apparatus according to the sixth example embodiment. A case of performing three-step wavelet transformation will be described here.

As illustrated in a part (a) of the diagram, the image signal processing apparatus according to the sixth example embodiment includes an image signal input unit 051, an image signal processing unit 052, and an image signal output unit 053.

The image signal input unit 051 and the image signal output unit 053 are similar to those in the image signal processing apparatus according to the second example embodiment.

As illustrated in a part (b) of the diagram, the image signal processing unit 052 includes a first WT unit 151, a second WT unit 152, a third WT unit 153, a first WC shrinkage unit 651, a second WC shrinkage unit 652, a third WC shrinkage unit 653, and a first IWT unit 251. The image signal processing unit 052 further includes a second IWT unit 252, a third IWT unit 253, a first STD unit 351, a second STD unit 352, a third STD unit 353, a fourth STD unit 354, and a first TC shrinkage unit 451. The image signal processing unit 052 further includes a second TC shrinkage unit 452, a third TC shrinkage unit 453, and a fourth TC shrinkage unit 454. The image signal processing unit 052 further includes a first combining unit 551, a second combining unit 552, a third combining unit 553, a fourth combining unit 554, a first filter coefficient computation unit 751, a second filter coefficient computation unit 752, a third filter coefficient computation unit 753, and a fourth filter coefficient computation unit 754. The image signal processing unit 052 further includes a first filter coefficient combining unit 851, a second filter coefficient combining unit 852, and a third filter coefficient combining unit 853. While an example of three-level wavelet transformation is described in the present example embodiment, the number of levels of wavelet transformation may be arbitrarily set.

An operation of each unit will be described below.

The first WT unit 151 applies a single-level wavelet transformation to an original image signal $f_{in}$ input from the image signal input unit 051 to compute a low-frequency component $LL_1$ and high-frequency components $LH_1$, $HL_1$, and $HH_1$ of the wavelet transformation. Then, the first WT unit 151 outputs the low-frequency component $LL_1$ to the second WT unit 152, and the high-frequency components $LH_1$, $HL_1$, $HH_1$ to the WC shrinkage unit 653.

The low-frequency component $LL_1$ is an image signal with a resolution one level lower than that of the original image signal $f_{in}$ in terms of wavelet transformation.

The second WT unit 152 applies a single-level wavelet transformation to a low-frequency component $LL_1$ of a first-level wavelet transformation input from the first WT unit 151 to compute a low-frequency component $LL_2$ and high-frequency components $LH_2$, $HL_2$, and $HH_2$. Then, the second WT unit 152 outputs the low-frequency component $LL_2$ to the third WT unit 153, and the high-frequency components $LH_2$, $HL_2$, and HL to the second WC shrinkage unit 452.

The low-frequency component $LL_2$ is an image signal with a resolution one level lower than that of the low-frequency component $LL_1$ in terms of wavelet transformation. In other words, the low-frequency component $LL_2$ is an image signal with a resolution two levels lower than an original image signal $f_{in}$ in terms of wavelet transformation.

The third WT unit 153 applies a single-level wavelet transformation to a low-frequency component $LL_2$ of a second-level wavelet transformation input from the second WT unit 152 to compute a low-frequency component $LL_3$ and high-frequency components $LH_3$, $HL_3$, and $HH_3$. Then, the third WT unit 153 outputs the low-frequency component $LL_3$ to the first filter coefficient computation unit 751, and the high-frequency components $LH_3$, $HL_3$, and $HH_3$ to the WC shrinkage unit 651.

The low-frequency component $LL_3$ is an image signal with a resolution one level lower than that of the low-frequency component $LL_2$ in terms of wavelet transformation. In other words, the low-frequency component $LL_3$ is an image signal with a resolution three levels lower than that of an original image signal $f_{in}$ in terms of wavelet transformation.

The first filter coefficient computation unit 751 computes a filter coefficient by use of a low-frequency component $LL_3$ of a wavelet transformation input from the third WT unit 153. That is to say, the first filter coefficient computation unit 751 outputs a set of filter coefficients $$h_3 = \{h_\alpha | \alpha \in \Omega_{LL3}\}$$

computed by equations (6) and (7) in a DTVF to the first filter coefficient combining unit 851. The low-frequency component $LL_3$ is output to the first STD unit 351.

The first STD unit 351 separates a low-frequency component $LL_3$ of a third-level wavelet transformation input from the third WT unit 153 into a structure component $u_3$ and a texture component $v_3$ by processing similar to that in the STD unit 321 according to the fifth example embodiment. Then, the first STD unit 351 outputs the structure component $u_3$ to the first combining unit 551, and the texture component $v_3$ to the first TC shrinkage unit 451.

The first TC shrinkage unit 451 generates a noise-suppressed texture component $v_3'$ with respect to a texture component $v_3$ input from the STD unit 351. Then, the first TC shrinkage unit 451 outputs the generated texture component $v_3'$ to the first combining unit 551.

The first combining unit 551 generates a corrected low-frequency component $LL_3'$ of a third-level wavelet transformation with respect to a structure component $u_3$ input from the first STD unit 351 and a noise-suppressed texture component $v_3'$ input from the first TC shrinkage unit 451. The generation is performed by processing similar to that in the combining unit 521 according to the fifth example embodiment. Then, the first combining unit 551 outputs the corrected low-frequency component $LL_3'$ of the third-level wavelet transformation to the first IWT unit 251.

The first WC shrinkage unit 651 computes corrected high-frequency components $LH_3'$, $HL_3'$, and $HH_3'$ of a third-level wavelet transformation with respect to high-frequency components $LH_3$, $HL_3$, and $HH_3$ of a third-level wavelet transformation input from the third WT unit 153. Then, the first WC shrinkage unit 651 outputs the corrected high-frequency components $LH_3'$, $HL_3'$, and $HH_3'$ of the third-level wavelet transformation to the first IWT unit 251.

The first IWT unit 251 generates a denoised low-frequency component $LL_2'$ of a second-level wavelet transformation from a low-frequency component $LL_3'$ and high-frequency components $LH_3'$, $HL_3'$, $HH_3'$ by use of inverse wavelet transformation. The low-frequency component $LL_3'$ is a corrected low-frequency component of a third-level wavelet transformation input from the first combining unit 551. Further, the high-frequency components $LH_3'$, $HL_3'$, and $HH_3'$ are corrected high-frequency components of the third-level wavelet transformation input from the first WC shrinkage unit 651. Then, the first IWT unit 251 outputs the noise-removed low-frequency component $LL_2'$ of the second-level wavelet transformation to the second filter coefficient computation unit 752.

The second filter coefficient computation unit 752 outputs a set of filter coefficients h2 obtained from a low-frequency component $LL_2'$ to the first filter coefficient combining unit 851. The low-frequency component $LL_2'$ is output to the second STD unit 352.

The first filter coefficient combining unit 851 combines a set of filter coefficients h3 with a set of filter coefficients h2 to create a set of filter coefficients h2' and outputs h2' to the second STD unit 352.

The second STD unit 352 separates a corrected low-frequency component $LL_2'$ of a second-level wavelet transformation input from the first IWT unit 251 into a structure component u2 and a texture component v2. The separation is performed by use of a set of filter coefficients h2' input from the first filter coefficient combining unit 851. Then, the structure component u2 and the texture component v2 are output to the second combining unit 552 and the second TC shrinkage unit 452. Further, the set of filter coefficients $$h_2 = \{h_\alpha | \alpha \in \Omega_{LL_2}\}$$

is output to the second filter coefficient combining unit 852.

The second TC shrinkage unit 452 generates a noise-suppressed texture component v2' with respect to a texture component v2 input from the second STD unit 352. Then, the generated texture component v2' is output to the second combining unit 552.

The second combining unit 552 generates a corrected low-frequency component $LL_2''$ of a second-level wavelet transformation with respect to a structure component u2 input from the second STD unit 352 and a noise-suppressed texture component v2' input from the second TC shrinkage unit 452. Then, the second combining unit 552 outputs the corrected low-frequency component $LL_2''$ to the second IWT unit 252.

An output image $f_{out}$ is obtained by thereafter repeating similar processing until a same resolution as that of an input image is obtained.

The first filter coefficient computation unit 751 and the first STD unit 351 may be integrated.

Two or three of the second filter coefficient computation unit 752, the first filter coefficient combining unit 851, and the second STD unit 352 may be integrated.

Two or three of the third filter coefficient computation unit 753, the second filter coefficient combining unit 852, and the third STD unit 353 may be integrated.

Two or three of the fourth filter coefficient computation unit 754, the third filter coefficient combining unit 853, and the fourth STD unit 354 may be integrated.

[Image Signal Processing Method According to Present Example Embodiment]

Figure 12:
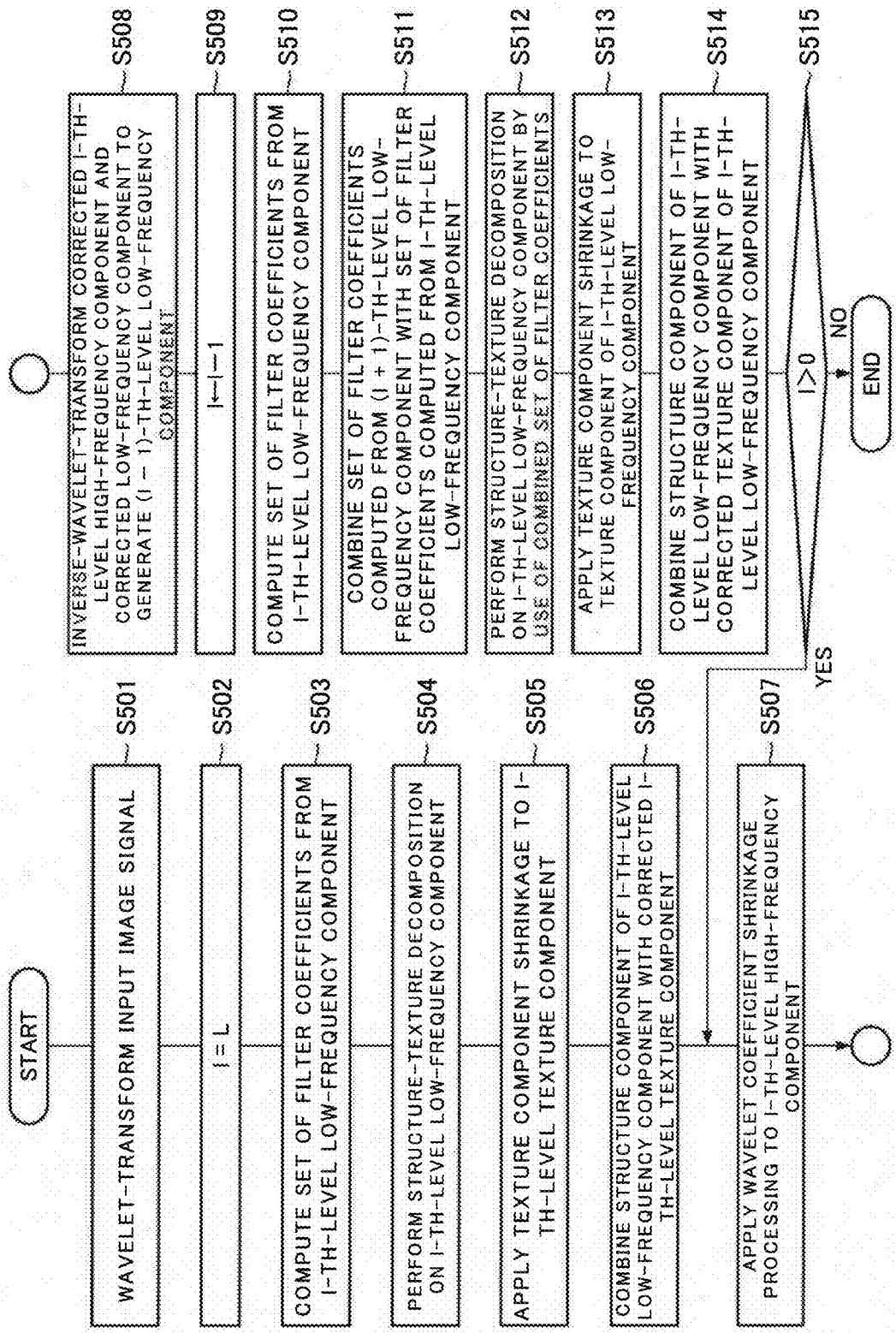
FIG. 12 is a flowchart illustrating an operation in an image signal processing method according to the sixth example embodiment.

FIG. 12 is a flowchart illustrating an operation in the image signal processing method according to the sixth example embodiment. A case of performing L-step wavelet transformation will be described here. In the case of the image signal processing unit 052 illustrated in FIG. 11, L=3.

First, an L-level multi-resolution wavelet transformation is applied to an input image (S501). Next, number of levels of interest l is set to l=L (S502). Then, a set of filter coefficients is computed by use of an l-th level low-frequency component (S503). Next, structure-texture decomposition is applied to the l-th level low-frequency component by the procedure described in relation to the first STD unit 351 to obtain a structure component and a texture component of the l-th level low-frequency component (S504). Then, a noise-suppressed texture component is obtained from the texture component of the l-th level low-frequency component by the procedure described in relation to the first TC shrinkage unit 451 (S505). Additionally, the structure component of the l-th level low-frequency component and the l-th level noise-suppressed texture component are combined by the procedure described in relation to the first combining unit 551 to obtain a corrected l-th level low-frequency component (S506). Next, shrinkage processing is applied to a high-frequency component obtained by a wavelet transformation, by the procedure described in relation to the WC shrinkage unit 651, to obtain a corrected high-frequency component (S507). By applying an inverse wavelet transformation by use of the thus corrected l-th level low-frequency component and l-th level high-frequency component, an (l−1)-th level low-frequency component is obtained (S508). Additionally, the value of l is decremented by one in order to increment the level of interest (S509). Then, a set of filter coefficients is computed from the l-th level low-frequency component (since the value of l is decremented by one in S509, the low-frequency component is one level higher than the low-frequency component in S503) (S510). Next, the set of filter coefficients computed in S503 is combined with the set of filter coefficients computed in S511 (S511). Then, by applying the procedure described in relation to the second STD unit 352, structure-texture decomposition is performed on the l-th level low-frequency component by use of the combined filter coefficients to obtain a structure component and a texture component of the l-th level low-frequency component (S512). Furthermore, the procedure described in relation to the second TC shrinkage unit 452 is applied to the texture component of the l-th level low-frequency component to obtain a noise-suppressed texture component of the l-th level low-frequency component (S513). Next, the structure component of the l-th level low-frequency component is combined with the noise-suppressed texture component of the l-th level low-frequency component to generate a corrected l-th level low-frequency component (S514). When l is greater than zero, the method returns to immediately before S507 to continue the processing (S515-Yes). When l is equal to zero, the method ends the processing (S515-No).

As is obvious from the description above, each unit may be configured with hardware but may also be provided by a computer program. In this case, a function and an operation similar to those according to the aforementioned example embodiment are provided by a processor operated by a program stored in a program memory. Further, only part of the functions according to the aforementioned example embodiment may be provided by the computer program.

[Effect of Present Example Embodiment]

The image signal processing apparatus according to the present example embodiment enhances the image signal processing in the image signal processing apparatus according to the fourth example embodiment to multi-resolution. Accordingly, in addition to the effect of the image signal processing apparatus according to the fourth example embodiment, an effect is obtained that noise removal more effective against noise in various frequencies can be provided.

<Seventh Example Embodiment>

A seventh example embodiment is an example embodiment related to an image signal processing apparatus combining the sixth example embodiment with the technology according to the fourth example embodiment.

[Image Signal Processing Apparatus According to Present Example Embodiment]

Figure 13:
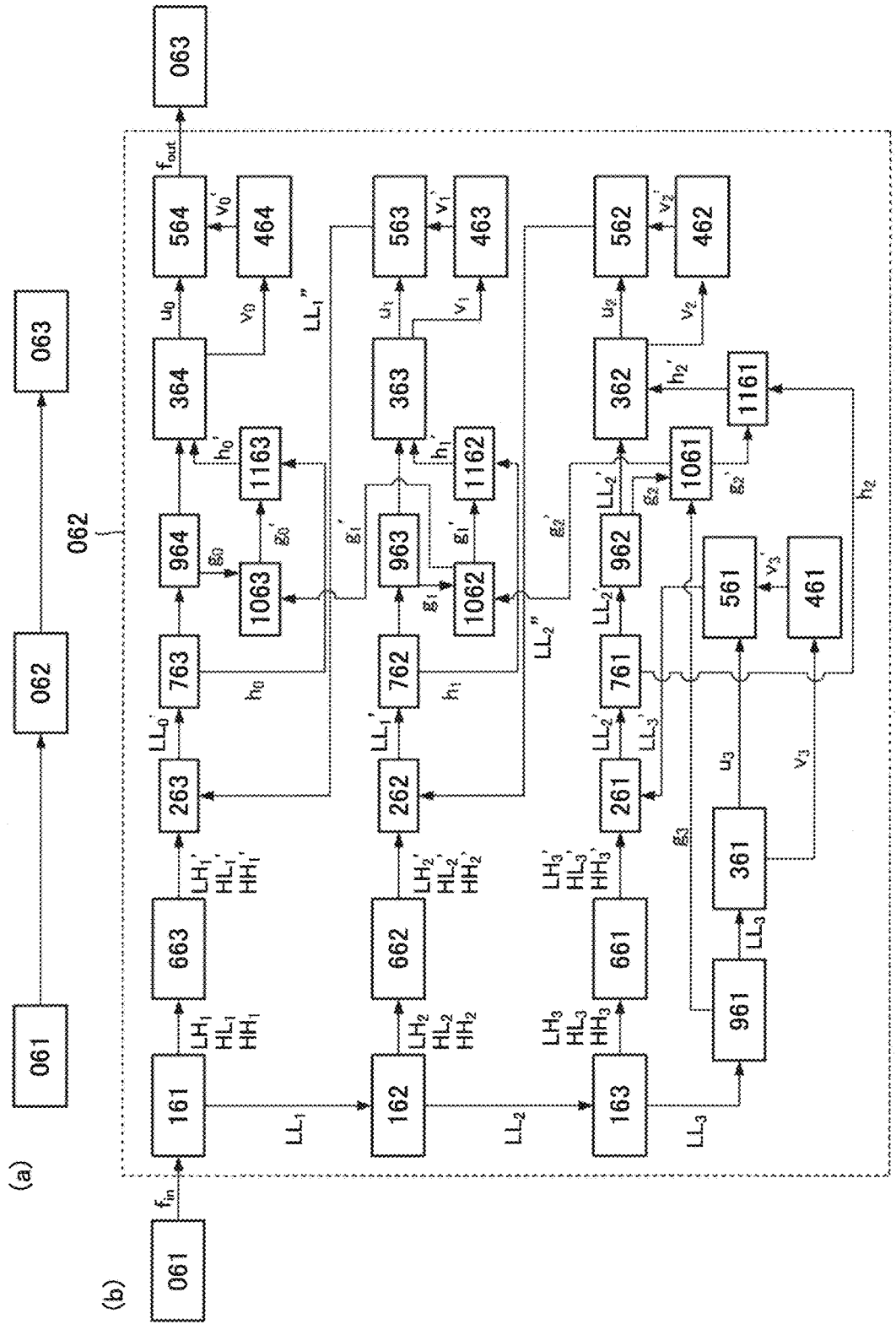
FIG. 13 is conceptual diagrams illustrating an image signal processing apparatus according to a seventh example embodiment.

FIG. 13 is conceptual diagrams illustrating an image signal processing apparatus according to the seventh example embodiment. A case that number of levels of wavelet transformation being performed is three-step will be described here.

The image signal processing apparatus according to the present example embodiment includes an image signal input unit 061, an image signal processing unit 062, and an image signal output unit 063.

The image signal input unit 061 and the image signal output unit 063 are similar to those in the image signal processing apparatus according to the second example embodiment.

As illustrated in a part (b) of the diagram, the image signal processing unit 062 includes a first WT unit 161, a second WT unit 162, a third WT unit 163, a first WC shrinkage unit 661, a second WC shrinkage unit 662, a third WC shrinkage unit 663, and a first IWT unit 261. The image signal processing unit 062 further includes a second IWT unit 262, a third IWT unit 263, a first STD unit 361, a second STD unit 362, a third STD unit 363, and a fourth STD unit 364. The image signal processing unit 062 further includes a first TC shrinkage unit 461, a second TC shrinkage unit 462, a third TC shrinkage unit 463, a fourth TC shrinkage unit 464, a first combining unit 561, a second combining unit 562, a third combining unit 563, and a fourth combining unit 564. The image signal processing unit 062 further includes a first filter coefficient computation unit 761, a second filter coefficient computation unit 762, a third filter coefficient computation unit 763, a first gradient intensity computation unit 961, a second gradient intensity computation unit 962, a third gradient intensity computation unit 963, and a fourth gradient intensity computation unit 964. The image signal processing unit 062 further includes a first gradient intensity combining unit 1061, a second gradient intensity combining unit 1062, and a third gradient intensity combining unit 1063. While an example of three-level wavelet transformation is described in the present example embodiment, the number of levels of wavelet transformation may be arbitrarily set.

The respective aforementioned components according to the present example embodiment operate in a same manner as the corresponding components according to the fourth and fifth example embodiments, and therefore description thereof is omitted.

The first gradient intensity computation unit 961 and the first STD unit 361 may be integrated.

Two or more of the first filter coefficient computation unit 761, the second gradient intensity computation unit 962, the first gradient intensity combining unit 1061, the first filter correction unit 1161, and the second STD unit 362 may be integrated.

Two or more of the second filter coefficient computation unit 762, the third gradient intensity computation unit 963, the second gradient intensity combining unit 1062, the second filter correction unit 1162, and the third STD unit 363 may be integrated.

Two or more of the third filter coefficient computation unit 763, the fourth gradient intensity computation unit 964, the third gradient intensity combining unit 1063, the third filter correction unit 1163, and the fourth STD unit 364 may be integrated.

[Image Signal Processing Method According to Present Example Embodiment]

Figure 14:
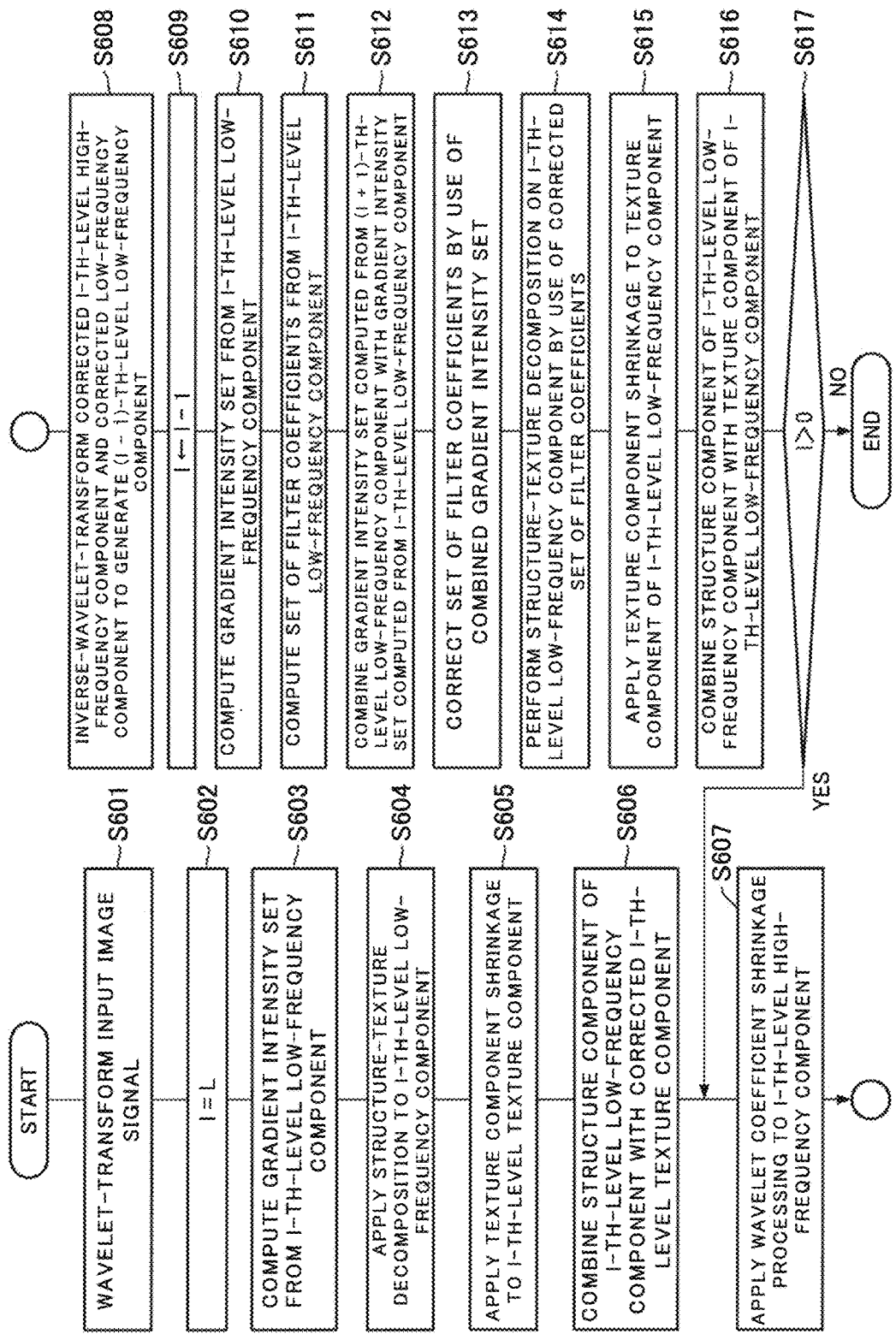
FIG. 14 is a flowchart illustrating an operation in an image signal processing method according to the seventh example embodiment.
Figure 15:
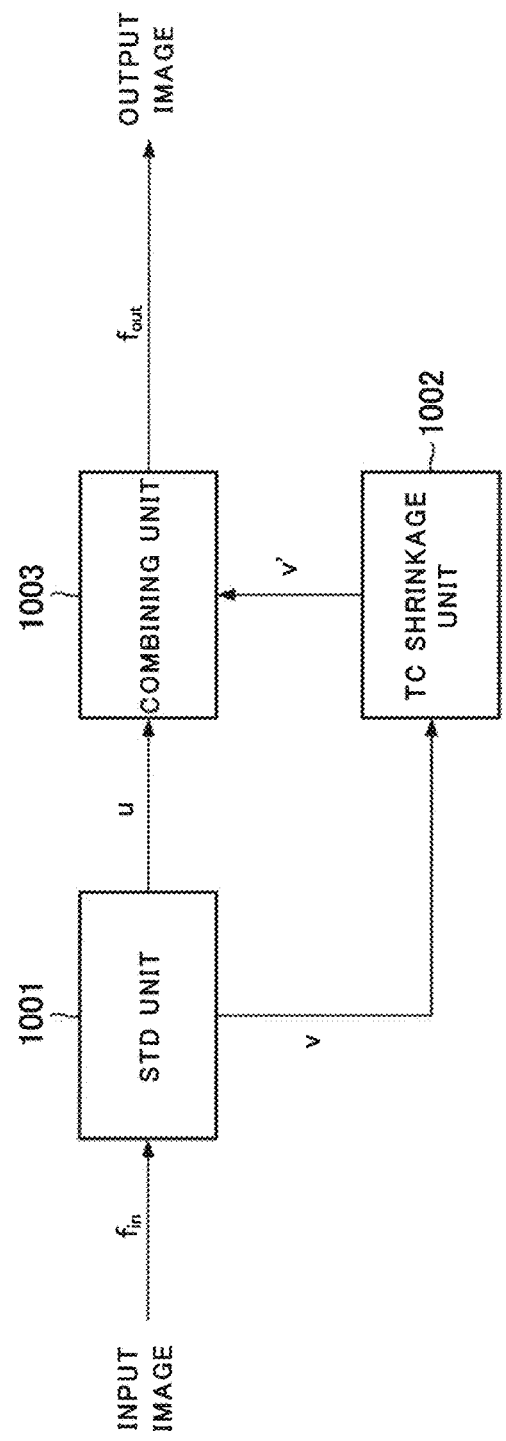
FIG. 15 is a conceptual diagram for illustrating the technology in NPL 1.
Figure 16:
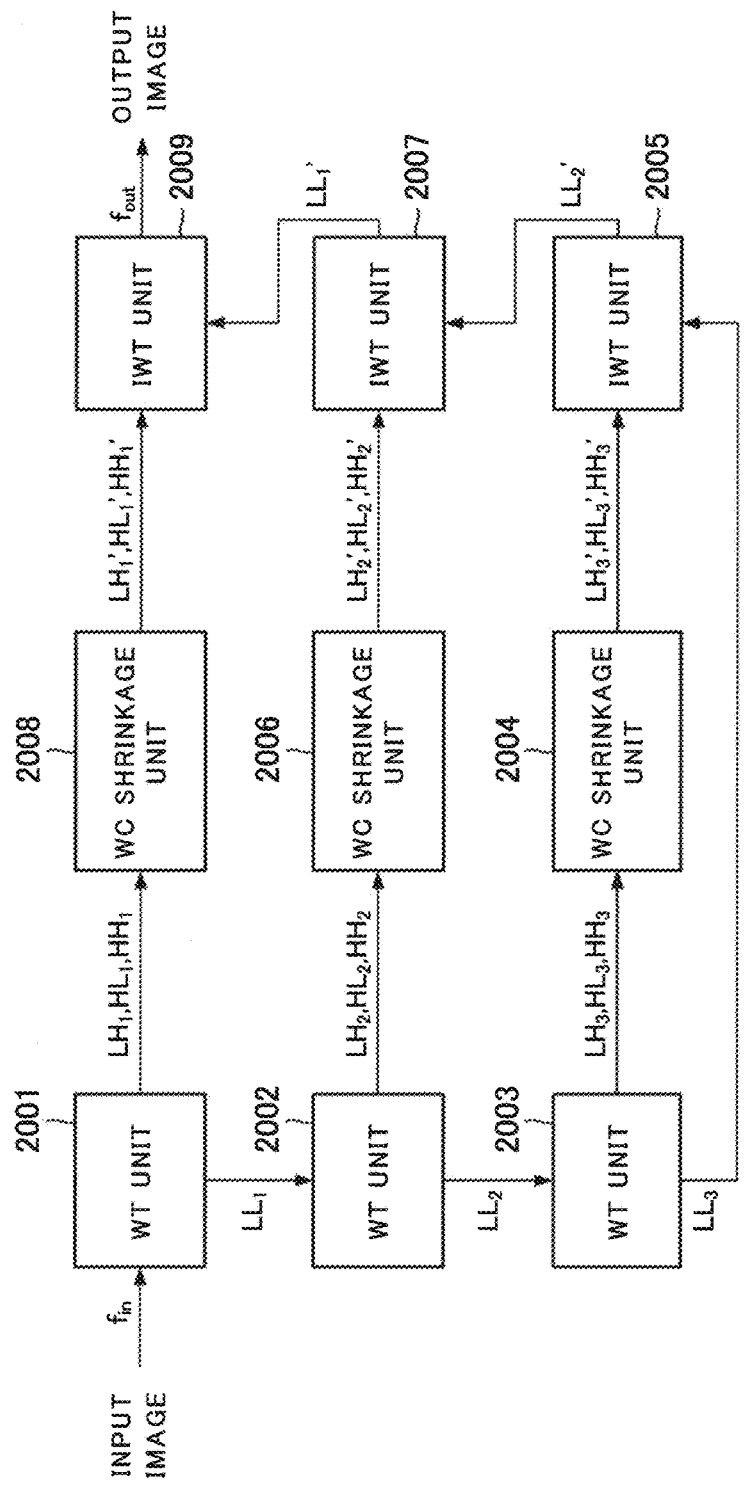
FIG. 16 is a conceptual diagram for illustrating the technology in NPL 2.
Figure 17:
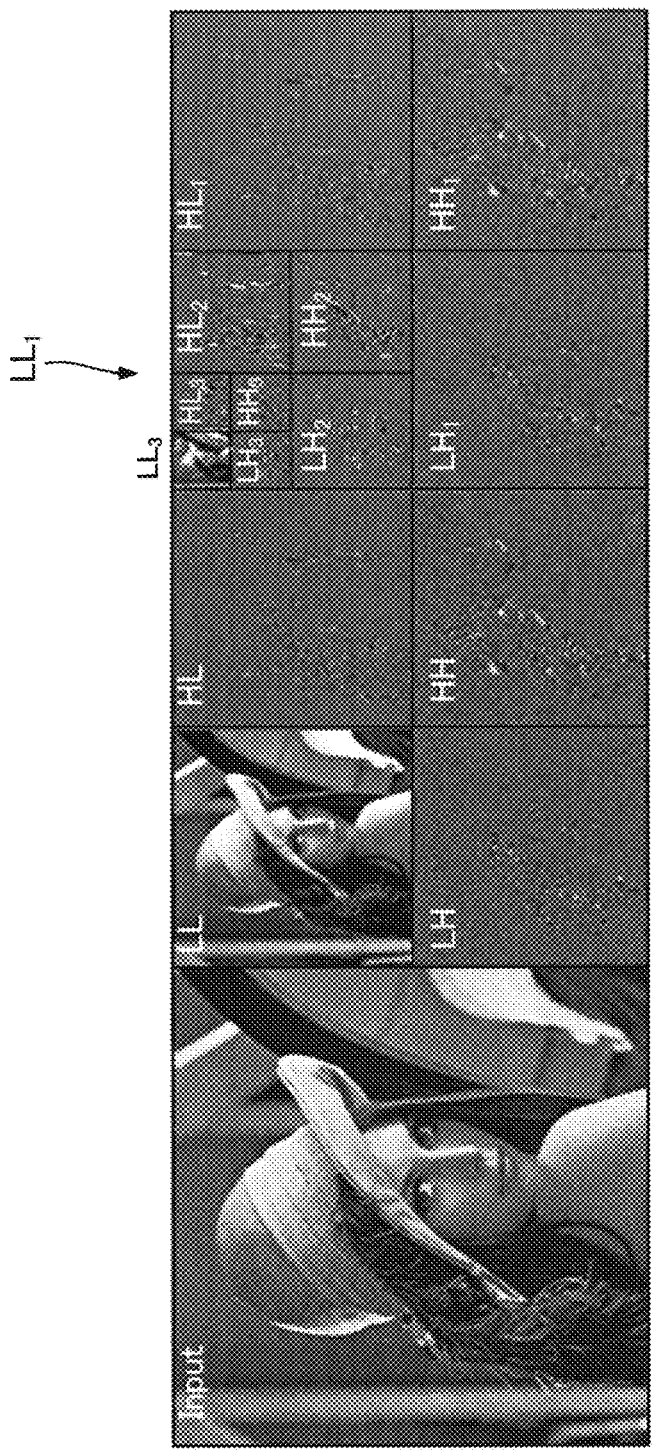
FIG. 17 is a diagram illustrating an application example of the technology in NPL 2.

Next, an image signal processing method according to the present example embodiment will be described. FIG. 14 is a flowchart illustrating the image signal processing method according to the present example embodiment. A case that number of levels of wavelet transformation being performed is L-step will be described here. In the case of the image signal processing unit 062 illustrated in FIG. 13, L=3.

First, an L-level multi-resolution wavelet transformation is applied to an input image (S601). A level of interest l is set to l=L (S602). A gradient intensity set is computed from an l-th level low-frequency component (S603).

Furthermore, structure-texture decomposition is applied to the l-th level low-frequency component to obtain a structure component and a texture component of the l-th level low-frequency component (S604). Additionally, a noise-suppressed texture component is obtained from the texture component of the l-th level low-frequency component (S605). Then, the structure component of the l-th level low-frequency component is combined with the noise-suppressed l-th level texture component to obtain a corrected l-th level low-frequency component (S606). Meanwhile, a corrected high-frequency component is obtained with respect to a high-frequency component obtained by the wavelet transformation (S607). By use of the thus corrected l-th level low-frequency component and high-frequency component, an inverse wavelet transformation is applied to obtain an (l−1)-th level low-frequency component (S608). Then, in order to increment the level of interest, the value of l is decremented by one (S609). A gradient intensity set is computed from the l-th level low-frequency component (S610). A set of filter coefficients is computed from the l-th level low-frequency component (S611). Additionally, the gradient intensity set obtained in S603 is combined with the gradient intensity set obtained in S610 (S612). The set of filter coefficients obtained in S611 is corrected by use of the gradient intensity set obtained in S612 (S613). Next, structure-texture decomposition is applied to the l-th level low-frequency component to obtain a structure component and a texture component of the l-th level low-frequency component (S614). Additionally, a noise-suppressed texture component of the l-th level low-frequency component is obtained with respect to the texture component of the l-th level low-frequency component (S615). Then, the structure component of the l-th level low-frequency component is combined with the noise-suppressed texture component of the l-th level low-frequency component to generate a corrected l-th level low-frequency component (S616). When l is greater than zero, the method returns to immediately before S607 to continue the processing (S617-Yes). When l is equal to zero, the method ends the processing (S617-No).

[Effect of Present Example embodiment]

The image signal processing apparatus according to the present example embodiment is obtained by adding the WC shrinkage unit according to the fifth example embodiment to the image signal processing apparatus according to the fourth example embodiment, and further enhancing the image signal processing to accommodate multi-resolution.

Accordingly, in addition to the effects of the image signal processing apparatuses according to the fourth and fifth example embodiments, an effect is obtained that noise removal more effective against noise in various frequencies can be provided.

While the present invention has been described above with reference to the preferred example embodiments, the present invention is not limited to the aforementioned example embodiments, and various changes and modifications may be made without departing from the spirit and scope of the present invention.

Further, a direction of an arrow in the respective drawings according to the aforementioned example embodiments indicates an example, and does not limit a signal direction between blocks.

The whole or part of the example embodiments disclosed above can be described as, but not limited to, the following supplementary notes.

(Supplementary Note 1)

An image signal processing apparatus including:

an image signal input unit inputting an image signal of an original image;

a wavelet transformation unit generating a low-frequency component and a high-frequency component by wavelet-transforming the image signal;

a first structure-texture separation unit separating the low-frequency component into a first structure component and a first texture component;

a texture component shrinkage unit removing noise with respect to the first texture component to generate the processed first texture component;

a first combining unit combining the first structure component with the corrected first texture component to generate a combined low-frequency component;

an inverse wavelet transformation unit generating an inverse-wavelet-transformed image signal by inverse-wavelet-transforming the high-frequency component and the combined low-frequency component;

a second structure-texture separation unit separating the inverse-wavelet-transformed image signal into a second structure component and a second texture component;

a second texture component shrinkage unit removing noise with respect to the second texture component to generate the processed second texture component;

a second combining unit combining the second structure component with the corrected second texture component to generate an image signal processing signal; and an image signal output unit outputting the corrected image signal.

(Supplementary Note 2)

The image signal processing apparatus according to Supplementary Note 1, further including a first filter coefficient computation means computing, from the inverse-wavelet-transformed image signal, a filter coefficient in separation into the second structure component and the second texture component in the second structure-texture separation unit.

(Supplementary Note 3)

The image signal processing apparatus according to Supplementary Note 2, further including a second filter coefficient computation means computing, from the low-frequency component, a filter coefficient in separation into the second structure component and the second texture component in the second structure-texture separation unit.

(Supplementary Note 4)

The image signal processing apparatus according to Supplementary Note 3, further including a filter coefficient combining means obtaining the filter coefficient in separation into the second structure component and the second texture component in the second structure-texture separation unit, by combining a filter coefficient computed by the first filter coefficient computation means with a filter coefficient computed by the second filter coefficient computation means.

(Supplementary Note 5)

The image signal processing apparatus according to Supplementary Note 2, further including a first gradient intensity computation means obtaining a gradient intensity of a pixel value at each point in an image for correcting the filter coefficient in separation into the second structure component and the second texture component in the second structure-texture separation unit, from an inverse-wavelet-transformed image signal.

(Supplementary Note 6)

The image signal processing apparatus according to Supplementary Note 5, further including a second gradient intensity computation means obtaining a gradient intensity of a pixel value at each point in an image for the correction, from the low-frequency component.

(Supplementary Note 7)

The image signal processing apparatus according to Supplementary Note 6, further including a gradient intensity combining means obtaining a gradient intensity of a pixel value at each point in an image for the correction, by combining a gradient intensity of a pixel value at each point in the image, being computed by the first gradient intensity computation means, with a gradient intensity of a pixel value at each point in the image, being computed by the second gradient intensity computation means.

(Supplementary Note 8)

The image signal processing apparatus according to any one of Supplementary Notes 1 to 7, further including a wavelet coefficient shrinkage unit removing noise in the high-frequency component.

(Supplementary Note 9)

The image signal processing apparatus according to any one of Supplementary Notes 1 to 8, further including:

a second wavelet transformation unit generating a second low-frequency component and a second high-frequency component by wavelet-transforming the low-frequency component;

a third structure-texture separation unit separating the second low-frequency component into a third structure component and a third texture component;

a third texture component shrinkage unit correcting a value of the third texture component to generate a corrected third texture component;

a third combining unit combining the third structure component with the corrected third texture component to generate a combined second low-frequency component;

an inverse wavelet transformation unit generating a second inverse-wavelet-transformed image signal by inverse-wavelet-transforming the second high-frequency component and the combined second low-frequency component;

a fourth structure-texture separation unit separating the second inverse-wavelet-transformed image signal into a fourth structure component and a fourth texture component;

a fourth texture component shrinkage unit correcting a value of the fourth texture component to generate a corrected fourth texture component; and a fourth combining unit combining the fourth structure component with the corrected fourth texture component to generate a second image signal processing signal.
(Supplementary Note 10)
The image signal processing apparatus according to Supplementary Note 9, further including
a third filter coefficient computation means computing a filter coefficient in separation into the third structure component and the third texture component in the third structure-texture separation unit, from the second inverse-wavelet-transformed image signal.
(Supplementary Note 11)
The image signal processing apparatus according to Supplementary Note 10, further including
a second filter coefficient combining means obtaining the filter coefficient in separation into the third structure component and the third texture component in the third structure-texture separation unit, by combining a filter coefficient combined in the filter coefficient combining means with a filter coefficient computed by the third filter coefficient computation means.
(Supplementary Note 12)
The image signal processing apparatus according to Supplementary Note 10, further including
a third gradient intensity computation means obtaining a gradient intensity of a pixel value at each point in an image for correcting the filter coefficient in separation into the third structure component and the third texture component in the third structure-texture separation unit, from an inverse-wavelet-transformed image signal in the second inverse wavelet transformation unit.
(Supplementary Note 13)
The image signal processing apparatus according to Supplementary Note 12, further including
a second gradient intensity combining means obtaining a gradient intensity of a pixel value at each point in an image for the correction, by combining a gradient intensity of a pixel value at each point in an image, being combined in the gradient intensity combining means, with a gradient intensity of a pixel value at each point in the image, being computed by the third gradient intensity computation means.
(Supplementary Note 14)
The image signal processing apparatus according to any one of Supplementary Notes 9 to 13, further including
a second wavelet coefficient shrinkage unit performing processing of removing noise in the second high-frequency component.
(Supplementary Note 15)
An image signal processing apparatus including:
an image signal input unit inputting an image signal of an original image;
a first wavelet transformation unit generating a first low-frequency component and a first high-frequency component by wavelet-transforming the image signal;
a second wavelet transformation unit generating a second low-frequency component and a second high-frequency component by wavelet-transforming the low-frequency component;
a noise removal means removing noise from a first low-frequency component by use of a second low-frequency component and a second high-frequency component;
a first inverse wavelet transformation unit generating an inverse-wavelet-transformed image signal, by inverse-wavelet-transforming a first low-frequency component with noise removed by the noise removal means, and the second high-frequency component or a processed second high-frequency component obtained by processing the second high-frequency component;
a first structure-texture separation unit separating the inverse-wavelet-transformed image signal into a first structure component and a first texture component;
a first texture component shrinkage unit removing noise with respect to the first texture component to generate the processed first texture component;
a first combining unit combining the first structure component with the corrected first texture component to generate an image signal processing signal; and
an image signal output unit outputting the corrected image signal.
(Supplementary Note 16)
The image signal processing apparatus according to Supplementary Note 15, wherein the noise removal means includes:
a second structure-texture separation unit separating the second low-frequency component into a second structure component and a second texture component;
a second texture component shrinkage unit removing noise with respect to the second texture component to generate the processed second texture component; and
a second combining unit combining the second structure component with the corrected second texture component to generate an image signal processing signal.
(Supplementary Note 17)
The image signal processing apparatus according to Supplementary Note 15 or 16, wherein the noise removal means includes
a wavelet coefficient shrinkage unit removing noise in the second high-frequency component.
(Supplementary Note 18)
The image signal processing apparatus according to Supplementary Note 17, further including
a noise removal means removing noise in the low-frequency component by a combination of the structure-texture separation, inverse wavelet transformation, and shrinkage processing.
(Supplementary Note 19)
The image signal processing apparatus according to any one of Supplementary Notes 15 to 18, further including
a first filter coefficient computation means computing a filter coefficient used for structure-texture separation in the first structure-texture separation unit, from the first inverse-wavelet-transformed image signal.
(Supplementary Note 20)
The image signal processing apparatus according to any one of Supplementary Notes 15 to 19, further including
a second filter coefficient computation means computing a filter coefficient used for structure-texture separation in the first structure-texture separation unit, from the second low-frequency component.
(Supplementary Note 21)
The image signal processing apparatus according to Supplementary Note 20, further including
a filter coefficient combining means combining a filter coefficient computed by the first filter coefficient computation means with a filter coefficient computed by the second filter coefficient computation means, wherein
structure-texture separation is performed in the first structure-texture separation unit by use of a filter coefficient combined by the filter coefficient combining means.

(Supplementary Note 22)

The image signal processing apparatus according to any one of Supplementary Notes 15 to 21, further including a first gradient intensity computation means obtaining a gradient intensity of a pixel value at each point in an image for correcting a filter coefficient in separation into the first structure component and the first texture component in the first structure-texture separation unit, from an inverse-wavelet-transformed image signal in the first inverse wavelet transformation unit.

(Supplementary Note 23)

The image signal processing apparatus according to Supplementary Note 22, further including a second gradient intensity computation means obtaining a gradient intensity of a pixel value at each point in an image for correcting a filter coefficient in separation into the first structure component and the first texture component in the first structure-texture separation unit, from the second low-frequency component or a processed second low-frequency component obtained by processing the second low-frequency component.

(Supplementary Note 24)

The image signal processing apparatus according to Supplementary Note 23, further including a gradient intensity combining means obtaining a gradient intensity of a pixel value at each point in an image for the correction by combining a gradient intensity of a pixel value at each point in the image, being computed by the first gradient intensity computation means, with a gradient intensity of a pixel value at each point in the image, being computed by the second gradient intensity computation means.

(Supplementary Note 25)

The image signal processing apparatus according to any one of Supplementary Notes 2 to 8, 10 to 14, and 18 to 24, wherein a filter coefficient of a nonlinear low-pass filter is used as the filter coefficient.

(Supplementary Note 26)

The image signal processing apparatus according to Supplementary Note 8, wherein correction of a high-frequency component in the wavelet coefficient shrinkage unit corrects the high-frequency component to be less than or equal to an absolute value thereof without changing a sign thereof.

(Supplementary Note 27)

The image signal processing apparatus according to Supplementary Note 14, wherein correction of a second high-frequency component in the second wavelet coefficient shrinkage unit corrects the high-frequency component to be less than or equal to an absolute value thereof without changing a sign thereof.

(Supplementary Note 28)

The image signal processing apparatus according to Supplementary Note 17, wherein correction of a high-frequency component in the wavelet coefficient shrinkage unit corrects the high-frequency component to be less than or equal to an absolute value thereof without changing a sign thereof.

(Supplementary Note 29)

The image signal processing apparatus according to Supplementary Note 7, wherein a combining ratio between a filter coefficient obtained by the first filter coefficient computation means and a filter coefficient obtained by the second filter coefficient computation means is determined in accordance with a variance of a local pixel value.

(Supplementary Note 30)

The image signal processing apparatus according to Supplementary Note 7, wherein a combining ratio between a filter coefficient combined by the filter coefficient combining means and a filter coefficient obtained by the third filter coefficient computation means is determined in accordance with a variance of a local pixel value.

(Supplementary Note 31)

The image signal processing apparatus according to Supplementary Note 24, wherein, by use of a filter coefficient obtained by combining a filter coefficient obtained by the third filter coefficient computation means with a filter coefficient obtained by the fourth filter coefficient computation means, the combining ratio is determined in accordance with a variance of a local pixel value.

(Supplementary Note 32)

The image signal processing apparatus according to Supplementary Note 1, further including a filter coefficient computation means computing a filter coefficient used in separation into the second structure component and the second texture component, wherein the filter coefficient is computed by combining an index based on a variation between a pixel of interest and a pixel adjacent to a pixel of interest, with an index based on a gradient intensity and a gradient direction of a pixel value in a range of several pixels around a pixel of interest.

(Supplementary Note 33)

The image signal processing apparatus according to Supplementary Note 1, further including a filter coefficient computation means computing a filter coefficient used in separation into the second structure component and the second texture component, wherein the filter coefficient is computed by combining an index based on a variation between a pixel of interest and a pixel adjacent to a pixel of interest, with an index based on a gradient intensity and a gradient direction of a pixel value in a range of several pixels around a pixel of interest.

(Supplementary Note 34)

The image signal processing apparatus according to Supplementary Note 15, further including a filter coefficient computation means computing a filter coefficient used in separation into the first structure component and the first texture component, wherein the filter coefficient is computed by combining an index based on a variation between a pixel of interest and a pixel adjacent to a pixel of interest, with an index based on a gradient intensity and a gradient direction of a pixel value in a range of several pixels around a pixel of interest.

(Supplementary Note 35)

The image signal processing apparatus according to Supplementary Note 1, further including a filter coefficient computation means computing a filter coefficient used in separation into the second structure component and the second texture component, wherein the filter coefficient is computed by use of an index based on a gradient intensity and a gradient direction of a pixel value in a range of several pixels around a pixel of interest, being computed from the low-frequency component.

(Supplementary Note 36)

The image signal processing apparatus according to Supplementary Note 4, wherein a combining ratio in combining a filter coefficient computed by the first filter coefficient computation means with a filter coefficient computed by the second filter coefficient computation means is determined by a variance of a local pixel value.

(Supplementary Note 37)

The image signal processing apparatus according to Supplementary Note 1, wherein the structure-texture separation unit further includes a nonlinear low-pass filter.

(Supplementary Note 38)

An image signal processing apparatus including:

a means for performing multi-resolution decomposition on an original image signal by use of wavelet transformation;

a means for separating a low-frequency component of a resolution concerned into a structure component composed of an edge and a flat component in an image, and a texture component composed of noise and a fine pattern, by successively using an edge-preserving nonlinear low-pass filter from a lowest resolution;

a means for correcting each value of the separated texture component to be less than or equal to an absolute value thereof without changing a sign thereof;

a means for combining the structure component with the corrected texture component to generate a low-frequency component of the corrected resolution concerned; and a means for repeating, when a resolution concerned is lower than an original image resolution, generation of a low-frequency component with a resolution one level higher than the resolution concerned by inverse wavelet transformation, from a low-frequency component with the corrected resolution concerned and a high-frequency component with the resolution concerned, until the resolution concerned becomes same as an original image, wherein, in filter coefficient computation by the edge-preserving nonlinear low-pass filter, when the resolution concerned is not a lowest resolution, a filter coefficient of a nonlinear low-pass filter computed with a resolution lower than the resolution concerned is combined with a filter coefficient of a nonlinear low-pass filter with the resolution concerned.

(Supplementary Note 39)

The image signal processing apparatus according to Supplementary Note 1, wherein the structure-texture separation unit includes a nonlinear low-pass filter, and a filter coefficient of the nonlinear low-pass filter is computed by combining an index based on a variation between a pixel of interest and a pixel adjacent to a pixel of interest, with an index based on a gradient intensity and a gradient direction of a pixel value in a range of several pixels around a pixel of interest.

(Supplementary Note 40)

An image signal processing method including:

a step of inputting an image signal of an original image;

a step of generating a low-frequency component and a high-frequency component by wavelet-transforming the image signal;

a step of separating the low-frequency component into a first structure component and a first texture component;

a step of removing noise from the first texture component to generate a noise-removed first texture component;

a step of combining the first structure component with the noise-removed first texture component to generate a combined low-frequency component;

a step of generating an inverse-wavelet-transformed image signal by inverse-wavelet-transforming the high-frequency component and the combined low-frequency component;

a step of separating the inverse-wavelet-transformed image signal into a second structure component and a second texture component;

a step of removing noise from the second texture component to generate a noise-removed second texture component;

a step of combining the second structure component with the corrected second texture component to generate an image signal processing signal; and a step of outputting the corrected image signal.

(Supplementary Note 41)

An image signal processing program causing a computer to perform:

processing of inputting an image signal of an original image;

processing of generating a low-frequency component and a high-frequency component by wavelet-transforming the image signal;

processing of separating the low-frequency component into a first structure component and a first texture component;

processing of removing noise from the first texture component to generate the noise-removed first texture component;

processing of combining the first structure component with the corrected first texture component to generate a combined low-frequency component;

processing of generating an inverse-wavelet-transformed image signal by inverse-wavelet-transforming the high-frequency component and the combined low-frequency component;

processing of separating the inverse-wavelet-transformed image signal into a second structure component and a second texture component;

processing of removing noise from the second texture component to generate the noise-removed second texture component;

processing of combining the second structure component with the corrected second texture component to generate an image signal processing signal; and processing of outputting the corrected image signal.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-230381, filed on Nov. 13, 2014, the disclosure of which is incorporated herein in its entirety by reference.

REFERENCE SIGNS LIST 001, 011, 021, 031, 041, 051, 061 Image signal input unit
002, 012, 022, 032, 042, 052, 062 Image signal processing unit
003, 013, 023, 033, 043, 053, 063 Image signal output unit
101, 111, 121, 131, 141 WT unit
151, 161 First WT unit
152, 162 Second WT unit
153, 163 Third WT unit
201, 211, 221, 231, 241 IWT unit
251, 261 First IWT unit
252, 262 Second IWT unit
253, 263 Third IWT unit 301, 311, 321, 331, 341, 351, 361 First STD unit
302, 312, 322, 332, 342, 352, 362 Second STD unit
343, 353, 363 Third STD unit
344, 354, 364 Fourth STD unit
401, 411, 421, 431, 441, 451, 461 First TC shrinkage unit
402, 412, 422, 432, 442, 452, 462 Second TC shrinkage unit
443, 453, 463 Third TC shrinkage unit
444, 454, 464 Fourth TC shrinkage unit
501, 511, 521, 531, 541, 551, 561 First combining unit
502, 512, 522, 532, 542, 552, 562 Second combining unit
543, 553, 563 Third combining unit
544, 554, 564 Fourth combining unit
641 WC shrinkage unit
651, 661 First WC shrinkage unit
652, 662 Second WC shrinkage unit
653, 663 Second WC shrinkage unit
710 Filter coefficient computation unit
721, 741, 751, 761 First filter coefficient computation unit
722, 742, 752, 762 Second filter coefficient computation unit
753, 763 Third filter coefficient computation unit
754 Fourth filter coefficient computation unit
820, 830, 840 Filter coefficient combining unit
851 First filter coefficient combining unit
852 Second filter coefficient combining unit
853 Third filter coefficient combining unit
930 Gradient intensity computation unit
961 First gradient intensity computation unit
962 Second gradient intensity computation unit
963 Third gradient intensity computation unit
1030 Gradient intensity combining unit
1061 First gradient intensity combining unit
1062 Second gradient intensity combining unit
1063 Third gradient intensity combining unit
1130 Filter correction unit
1161 First filter correction unit
1162 Second filter correction unit
1163 Third filter correction unit

What is claimed is:

1. An image signal processing apparatus comprising:
an image signal input circuit inputting an image signal of an original image;
a wavelet transformation circuit generating a low-frequency component and a high-frequency component by wavelet-transforming the image signal;
a first structure-texture separation circuit separating the low-frequency component into a first structure component and a first texture component;
a texture component shrinkage circuit removing noise with respect to the first texture component to generate the processed first texture component;
a first combining circuit combining the first structure component with the corrected first texture component to generate a combined low-frequency component;
an inverse wavelet transformation circuit generating an inverse-wavelet-transformed image signal by inverse-wavelet-transforming the high-frequency component and the combined low-frequency component;
a second structure-texture separation circuit separating the inverse-wavelet-transformed image signal into a second structure component and a second texture component;
a second texture component shrinkage circuit removing noise with respect to the second texture component to generate the processed second texture component;
a second combining circuit combining the second structure component with the corrected second texture component to generate an image signal processing signal; and
an image signal output circuit outputting the corrected image signal.

2. The image signal processing apparatus according to claim 1, further comprising,
a first filter coefficient computation circuit computing, from the inverse-wavelet-transformed image signal, a filter coefficient :in separation into the second structure component and the second texture component in the second structure-texture separation circuit.

3. The image signal processing apparatus according to claim 2, further comprising,
a second filter coefficient computation circuit computing, from the low-frequency component, a filter coefficient in separation into the second structure component and the second texture component in the second structure-texture separation circuit.

4. The image signal processing apparatus according to claim 3, further comprising,
a filter coefficient combining circuit obtaining the filter coefficient in separation into the second structure component and the second texture component in the second structure-texture separation circuit, by combining a filter coefficient computed by the first filter coefficient computation circuit with a filter coefficient computed by the second filter coefficient computation circuit.

5. The image signal processing apparatus according to claim 2, further comprising,
first gradient intensity computation circuit obtaining a gradient intensity of a pixel value at each point in an image for correcting the filter coefficient in separation into the second structure component and the second texture component in the second structure-texture separation circuit, from an inverse-wavelet-transformed image signal.

6. The image signal processing apparatus according to claim 5, further comprising,
a second gradient intensity computation circuit obtaining a gradient intensity of a pixel value at each point in an image for the correction, from the low-frequency component.

7. The image signal processing apparatus according to claim 6, further comprising,
gradient intensity combining circuit obtaining a gradient intensity of a pixel value at each point in an image for the correction, by combining a gradient intensity of a pixel value at each point in the image, being computed by the first gradient intensity computation circuit, with a gradient intensity of a pixel value at each point in the image, being computed by the second gradient intensity computation circuit.

8. The image signal processing apparatus according to claim 1, further comprising,
a wavelet coefficient shrinkage circuit removing noise in the high-frequency component.

9. An image signal processing method comprising:
inputting an image signal of an original image;
generating a low-frequency component and a high-frequency component by wavelet-transforming the image signal;
separating the low-frequency component into a first structure component and a first texture component;
removing noise from the first texture component to generate a noise-removed first texture component;

combining the first structure component with the noise-removed first texture component to generate a combined low-frequency component;

generating an inverse-wavelet-transformed image signal by inverse-wavelet-transforming the high-frequency component and the combined low-frequency component;

separating the inverse-wavelet-transformed image signal into a second structure component and a second texture component;

removing noise from the second texture component to generate a noise-removed second texture component;

combining the second structure component with the corrected second texture component to generate an image signal processing signal; and outputting the corrected image signal.

10. A non-transitory computer-readable medium recorded with an image signal processing program causing a computer to perform a method comprising:

processing of inputting an image signal of an original image;

processing of generating a low-frequency component and a high-frequency component by wavelet-transforming the image signal;

processing of separating the low-frequency component into a first structure component and a first texture component;

processing of removing noise from the first texture component to generate the noise-removed first texture component;

processing of combining the first structure component with the corrected first texture component to generate a combined low-frequency component;

processing of generating an inverse-wavelet-transformed image signal by inverse-wavelet-transforming the high-frequency component and the combined low-frequency component;

processing of separating the inverse-wavelet-transformed image signal into a second structure component and a second texture component;

processing of removing noise from the second texture component to generate the noise-removed second texture component;

processing of combining the second structure component with the corrected second texture component to generate an image signal processing signal; and processing of outputting the corrected image signal.

* * * * *